(12) United States Patent
He et al.

(10) Patent No.: US 11,425,422 B2
(45) Date of Patent: Aug. 23, 2022

(54) PARAMETER SET SYNTAX ELEMENTS AND VARIABLES IN VIDEO CODING

(71) Applicant: QUALCOMM Incorporated, San Diego, CA (US)

(72) Inventors: Yong He, San Diego, CA (US); Vadim Seregin, San Diego, CA (US); Muhammed Zeyd Coban, Carlsbad, CA (US); Yao-Jen Chang, San Diego, CA (US); Marta Karczewicz, San Diego, CA (US); Nan Hu, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 0 days.

(21) Appl. No.: 17/318,775

(22) Filed: May 12, 2021

(65) Prior Publication Data

US 2021/0360289 A1    Nov. 18, 2021

Related U.S. Application Data

(60) Provisional application No. 63/024,331, filed on May 13, 2020, provisional application No. 63/026,609, filed on May 18, 2020, provisional application No. 63/028,341, filed on May 21, 2020.

(51) Int. Cl.
| | | |
|---|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/70* | (2014.01) |
| *H04N 19/172* | (2014.01) |
| *H04N 19/184* | (2014.01) |

(52) U.S. Cl.
CPC ........... *H04N 19/70* (2014.11); *H04N 19/172* (2014.11); *H04N 19/184* (2014.11)

(58) Field of Classification Search
CPC ..... H04N 19/176; H04N 19/119; H04N 19/70
See application file for complete search history.

(56) References Cited

PUBLICATIONS

Bross et al. Versatile Video Coding (Draft 9), JVET-R2001-vB, Joint Video Experts Team (JVET) of ITU-T SG 16 WP 3 and ISO/IEC JTC 1/SC 29/WG 11—18th Meeting: by teleconference, Apr. 15-24 (Year: 2020).*
Hannuksela, AHG12: On independently coded picture regions, JVET-O0394, Joint Video Experts Team (JVET) of ITU-T SG 16 WP 3 and ISO/IEC JTC 1/SC 29/WG 11 15th Meeting: Gothenburg, SE, Jul. 3-12 (Year: 2019).*

(Continued)

*Primary Examiner* — Fabio S Lima
(74) *Attorney, Agent, or Firm* — Abhishek Rastogi

(57) ABSTRACT

Example methods and devices for coding video data are disclosed. An example device for coding video data includes memory configured to store the video data, and one or more processors implemented in circuitry and communicatively coupled to the memory. The one or more processors are configured to determine a value of a first syntax element indicative of whether a first constraint is applicable, the first constraint being that rectangular slices are not used for a plurality of pictures. The one or more processors are also configured to decode the plurality of pictures of the video data in accordance with the value of the first syntax element.

20 Claims, 9 Drawing Sheets

(56) References Cited

PUBLICATIONS

International Search Report and Written Opinion—PCT/US2021/032219—ISA/EPO—dated Aug. 12, 2021.
ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Kim J., et al., "CE6-related: Clarifying Decoder's Ambiguous Behaviour for Escape Index in Palette Mode", JCTVC-S0115, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-9.
Kim J., et al., "CE6-related: Enabling Copy Above Mode Prediction at the Boundary of CU," 19th JCT-VC Meeting; Oct. 17, 2014-Oct. 24, 2014; Strasbourg, FR, (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-S0114, Oct. 8, 2014 (Oct. 8, 2014), XP030116870, 7 pages.
Pang C., et al., "Non-CE2: Intra Block Copy with Inter Signaling", 19th JCT-VC Meeting; Oct. 17, 2014-Oct. 24, 2014; Strasbourg; FR; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-S0113-v4, Oct. 21, 2014 (Oct. 21, 2014), JCTVC-S0113 (Version 4), XP030116869, 4 Pages.
Pang C., et al., "Non-CE2: On Intra Block Copy," 19th JCT-VC Meeting; Oct. 17, 2014-Oct. 24, 2014; Strasbourg; FR, (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-S0112-r1, Oct. 8, 2014 (Oct. 8, 2014), XP030116866, pp. 1-6.
Pettersson M., et al., "HLS: Dependent RAP Indication SEI Message", JCTVC-S0095-v2, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-4.
Pu W., et al., "Non-CE6: Improvement on Palette Run Coding", 19th JCT-VC Meeting; 17-10-201—Oct. 24, 2014; Strasbourg; FR (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-S0111-r3, Oct. 24, 2014 (Oct. 24, 2014), pp. 1-4, XP030116865.
Pu W., et al., "Non-CE6: Syntax Redundancy Fixes for Palette Mode", JCTVC-S0110-r1, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-9.
Ye J., et al., "CE3: Test 2.1 Combination of Test 1.1 and Test 1.3", JCTVC-S0118, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-6.
Zhang K., et al., "CE3 Test 2.2: Combined Test of Test 1.2 and Test 1.3", JCTVC-S0119, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-2.

Bross B., et al., "Versatile Video Coding (Draft 10)," 131, MPEG Meeting, Jun. 22, 2020-Jul. 1, 2020, Online, (Motion Picture Expert Group or ISO/IEC JTC1/SC29/WG11), No. m54716, JVET-S2001, Jun. 25, 2020 (Jun. 25, 2020), XP030289298, 529 pages, Retrieved from the Internet: URL:http://phenix.int-evry.fr/mpeg/doc_end_user/documents/131_Teleconference/wg11/m54716-JVET-S2001-v2-JVET-S02001-v2.zip JVET-S02001-v2.docx [retrieved on Jun. 25, 2020].
Bross B., et al., "Versatile Video Coding (Draft 9)," 130th MPEG Meeting, 18th JVET Meeting, Apr. 15, 2020-Apr. 24, 2020, Alpbach, (Motion Picture Expert Group or ISO/IEC JTC1/SC29/WG11 and JVET of ITU-T SG 16 WP 3 and ISO/IEC JTC 1/SC 29/WG 11), No. m53983, JVET-R2001-v8, May 6, 2020 (May 6, 2020), XP030287934, 524 pages, Retrieved from the Internet: URL: http://phenix.int-evry.fr/mpeg/doc_end_user/documents/130_Alpbach/wg11/m53983-JVET-R2001-v8-JVET-R2001-v8.zip JVET-R2001-v8.docx [retrieved on May 6, 2020].
Chen J., et al., "AHG12: On Tile and Slice Partitioning Related Syntax and Semantics", JVET-S0095-v1, Joint Video Experts Team (JVET) of ITU-T SG 16 WP 3 and ISO/IEC JTC 1/SC 29/WG 11, 19th Meeting: by teleconference, Jun. 22-Jul. 1, 2020, pp. 1-8.
Hannuksela (Nokia) M M: "AHG12: On Independently Coded Picture Regions," 15. JVET Meeting, Jul. 3, 2019-Jul. 12, 2019, Gothenburg, (The Joint Video Exploration Team of ISO/IEC JTC1/SC29/WG11 and ITU-T SG.16), No. JVET-O0394, m48513, Jun. 26, 2019 (Jun. 26, 2019), XP030219449, 8 pages, Retrieved from the Internet: URL: http://phenix.int-evry.fr/jvet/doc_end_user/documents/15_Gothenburg/wg11/JVET-O0394-v1.zip JVET-O0394.docx [retrieved on Jun. 26, 2019].
He Y., et al., "AHG9: Expression of Existing Intent for VPS/SPS/PPS Syntax Elements", JVET-S0119, Joint Video Experts Team (JVET) of ITU-T SG 16 WP 3 and ISO/IEC JTC 1/SC 29/WG 11, 19th Meeting: by teleconference, Jun. 22-Jul. 1, 2020, pp. 1-2.
He Y., et al., "AHG9: On GCI Semantic Constraints", JVET-S0112, Joint Video Experts Team (JVET) of ITU-T SG 16 WP 3 and ISO/IEC JTC 1/SC 29/WG 11, 19th Meeting: by teleconference, Jun. 22-Jul. 1, 2020, pp. 1-4.
He Y., et al., "AHG9: On GCI Syntax Structure", JVET-S0111, Joint Video Experts Team (JVET) of ITU-T SG 16 WP 3 and ISO/IEC JTC 1/SC 29/WG 11, 19th Meeting: by teleconference, Jun. 22-Jul. 1, 2020, pp. 1-3.
He Y., et al., "AHG9: On GDR RPL Constraint", JVET-S0114, Joint Video Experts Team (JVET) of ITU-T SG 16 WP 3 and ISO/IEC JTC 1/SC 29/WG 11, 19th Meeting: by teleconference, Jun. 22-Jul. 1, 2020, pp. 1-2.
He Y., et al., "AHG9: On HLS Editorial Cleanups", JVET-S0110v2, Joint Video Experts Team (JVET) of ITU-T SF 16 WP 3 and ISO/IEC JTC 1/SC 29/WG 11, 19th Meeting: by teleconference, Jun. 22-Jul. 1, 2020, pp. 1-4.
He Y., et al., "AHG9: On HRD Bitstream", JVET-S0118-v2, Joint Video Experts Team (JVET) of ITU-T SG 16 WP 3 and ISO/IEC JTC 1/SC 29/WG 11, 19th Meeting: by teleconference, Jun. 22-Jul. 1, 2020, pp. 1-2.
He Y., et al., "AHG9: On SPS Cleanups", JVET-S0115, Joint Video Experts Team (JVET) of ITU-T SG 16 WP 3 and ISO/IEC JTC 1/SC 29/WG 11, 19th Meeting: by teleconference, Jun. 22-Jul. 1, 2020, pp. 1-2.

* cited by examiner

PARAMETER SET SYNTAX ELEMENTS AND VARIABLES IN VIDEO CODING

This application claims priority to U.S. Provisional Patent Application 63/024,331, filed May 13, 2020, U.S. Provisional Patent Application 63/026,609, filed May 18, 2020, and U.S. Provisional Patent Application 63/028,341, filed May 21, 2020, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding parameter set syntax elements and variables in video coding. More specifically, this disclosure describes coding syntax elements and variables indicative of whether constraints on video coding may be applied, including picture headers in a Type I bitstream, derivation processes, constraints, and other video coding techniques.

In one example, a method includes determining a value of a first syntax element indicative of whether a first constraint is applicable, the first constraint being that rectangular slices are not used for a first plurality of pictures, and decoding the first plurality of pictures of the video data in accordance with the value of the first syntax element.

In one example, a device includes memory configured to store the video data, and one or more processors implemented in circuitry and communicatively coupled to the memory, the one or more processors being configured to: determine a value of a first syntax element indicative of whether a first constraint is applicable, the first constraint being that rectangular slices are not used for a first plurality of pictures; and decode the first plurality of pictures of the video data in accordance with the value of the first syntax element.

In one example, a non-transitory computer-readable medium includes instructions that, when executed, cause one or more processors to: determine a value of a first syntax element indicative of whether a first constraint is applicable, the first constraint being that rectangular slices are not used for a first plurality of pictures; and decode the first plurality of pictures of the video data in accordance with the value of the first syntax element.

In another example, a device includes means for determining a value of a first syntax element indicative of whether a first constraint is applicable, the first constraint being that rectangular slices are not used for a first plurality of pictures, and means for decoding the first plurality of pictures of the video data in accordance with the value of the first syntax element.

The details of one or more examples are set forth in the accompanying drawings and the description below. Other features, objects, and advantages will be apparent from the description, drawings, and claims.

DETAILED DESCRIPTION

Some video coding standards and draft standards include constraints on a coded bitstream. These constraints must be met to ensure bitstream compliance with the particular standard or draft standard. In some examples, a constraint may be applied or not applied (e.g., turned on or turned off). In some examples, constraints may not be present in a video coding standard or draft standard. Additionally, in some video coding standards or draft standards, certain bitstreams, such as a Type I bitstream are defined. For example, a Type I bitstream may be defined to only include video coding layer (VCL) network abstraction layer (NAL) units. However, all the elements needed to decode the bitstream may not be present in such a bitstream. In such cases, unnecessary decoding latency may be present or unnecessary decoding errors may occur as a video decoder may not be able to accurately decode the bitstream without the missing elements.

In accordance with the techniques of this disclosure, constraint flags indicative of whether a constraint is to be applied are disclosed. These constraint flags may communicate from a video encoder to a video decoder which features are disabled. In this manner, a video decoder may infer values of other syntax elements based on the constraint flags rather than parse other syntax elements that may be at a lower level, and therefore, otherwise more frequently needing to be signaled. In this manner, signaling bandwidth may be saved and processing power on both a video encoder and video decoder may be reduced, due to less signaling and parsing, respectively.

In accordance with the techniques of this disclosure, a Type I bitstream may be defined to include picture header (PH) network abstraction layer (NAL) units, in addition to VCL NAL units. By additionally including PH NAL units in a Type I bitstream, decoding latency and/or accuracy may be improved, because PH NAL units may be needed by a video decoder to decode video coding layer (VCL) NAL units within the Type I bitstream.

Figure 1:
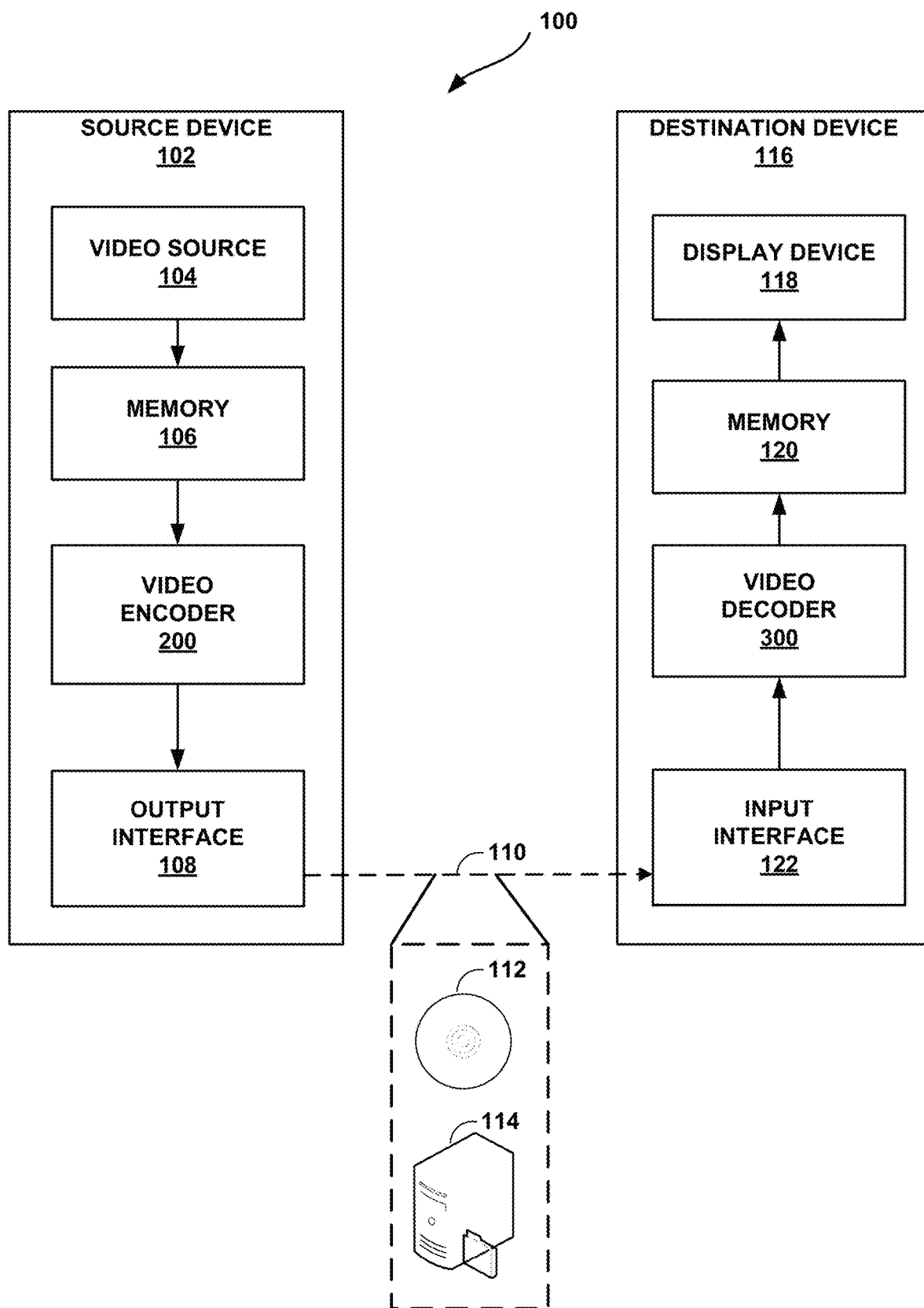
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for improving parameter set syntax elements and variables in VVC. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for improving parameter set syntax elements and variables in VVC. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 9)," Joint Video Experts Team (WET) of ITU-T SG 16 WP 3 and ISO/IEC JTC 1/SC 29/WG 11, 18$^{th}$ Meeting: by teleconference, 15-24 Apr. 2020, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
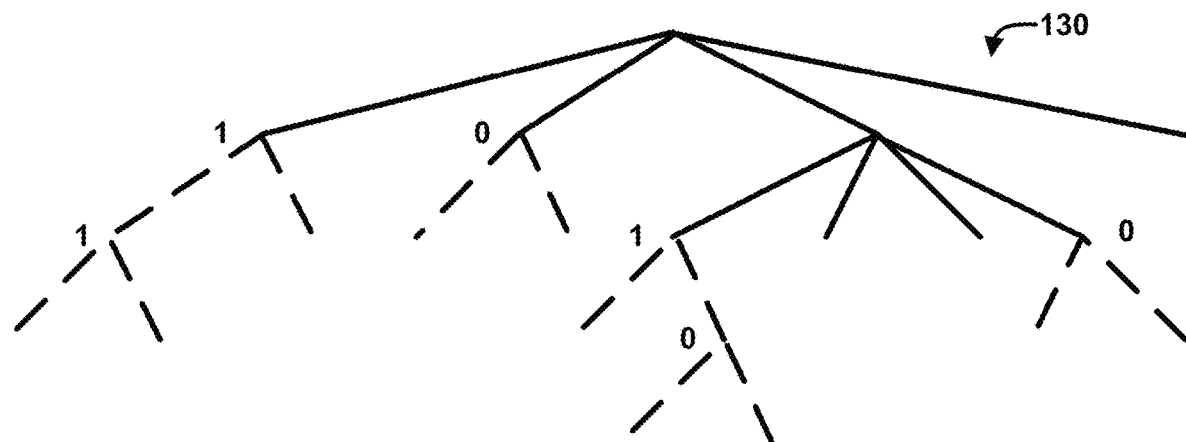
FIGS. 2A and 2B are conceptual diagrams illustrating an example quadtree binary tree (QTBT) structure, and a corresponding coding tree unit (CTU).
Figure 2B:
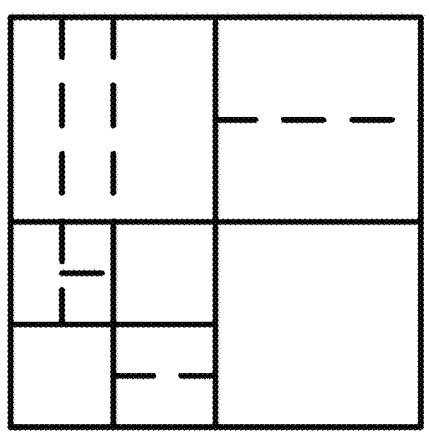

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs and are further processed according to prediction and transform without further partitioning.

As mentioned above, some video coding standards and draft standards include constraints on a coded bitstream. A constraint is a limitation that may be placed on a bitstream. One such video coding standard is VVC. VVC has been developed by a Joint Video Experts Team (JVET) of ITU-T and ISO/IEC to achieve substantial compression capability beyond HEVC for a broadened range of applications. VVC Draft 9 specifies normative bitstream and picture formats, high level syntax (HLS) and semantics, and the parsing and decoding process. VVC Draft 9 also specifies profiles/tiers/levels (PTL) restrictions, byte stream format, hypothetical reference decoder and supplemental enhancement information (SEI) in the annex.

VVC Draft 9 inherits a number of high-level features from HEVC, such as network abstraction layer (NAL) unit and parameter set concepts, tile and wave-front parallel processing, layered coding and the use of SEI messages for supplemental data signaling. For example, a parameter set may include information applicable to a sequence, a picture, video, etc., that may be signaled by video encoder 200 or received and parsed by video decoder 300, and used by video decoder 300 to decode video data in an encoded bitstream. Additional new high-level features are introduced in VVC, including a rectangular slice and subpicture concept, picture resolution adaptation, mixed NAL unit types, a picture header (PH), a gradual decoding refresh (GDR) picture, virtual boundaries, and the reference picture list (RPL) for reference picture management.

Numerous signaling conditions or semantic constraints are specified in VVC Draft 9 on the parameter set syntax elements, and the variables which video decoder 300 may derive from the syntax elements which are used in the decoding process.

A number of issues concerning syntax elements and variables in VVC Draft 9 are identified as follows:

1. VVC Draft 9 specifies that "when sps_gdr_enabled_flag is equal to 1 and PicOrderCntVal of the current picture is greater than or equal to recoveryPointPocVal of the associated GDR picture, the current and subsequent decoded pictures in output order are exact matches to the corresponding pictures produced by starting the decoding process from the previous TRAP picture, when present, preceding the associated GDR picture in decoding order." However, there is no RPL constraint specified to guarantee the exact match. sps_grd_enabled_flag is a syntax element in an SPS that indicates whether GDR pictures may be present in coded layer video sequences (CLVSs) referring to the SPS. PicOrderCntVal of a picture indicates a POC value of a picture.
2. The derivation of the variable NumSubLayersInLayerinOLS in VVC Draft 9 is problematic for sub-bitstream extraction. This disclosure includes an updated derivation process. In VVC Draft 9, the variable NumSubLayersInLayerinOLS indicates a number of sub-layers in a layer in an output layer set.
3. A number of semantics of general constraint flags are described in this disclosure to address various issues.
4. A number of new general constraint flags are introduced in this disclosure to address various issues.
5. A semantic constraint is specified for the syntax element sps_max_sublayers_minus1 in this disclosure. In VVC Draft 9, sps_max_sublayers_minus1 is a syntax element in an SPS. sps_max_sublayers_minus1, plus 1, specifies a maximum number of temporal sublayers that may be present in each CLVS referring to the SPS. VVC Draft 9 specifies that the value of sps_max_sublayers_minus1 shall be in the range of 0 to vps_max_sublayers_minus1, inclusive.
6. A number of syntax elements such as sps_num_subpics_minus1, pps_num_exp_tile_columns_minus1, pps_num_exp_tile_rows_minus1 and pps_tile_idx_delta_present_flag may not be explicitly signaled in the parameter sets and their values may be inferred under certain conditions. sps_num_subpics_minus1 plus 1 specifies the number of subpictures in each picture in a CLVS.
7. PH NAL should be present in a bitstream in VVC Annex C, Hypothetical Reference Decoder.
8. A number of syntax elements in the parameter sets should be specified in one way, for example, in a consistent manner.

The techniques of this disclosure may address one or more of these issues. The examples provided in this disclosure may be used individually or in any combination.

A reference list constraint for a GDR picture is now discussed. In some cases, pictures after a GDR picture may reference pictures prior to the GDR picture. When a GDR picture is a first picture of a video sequence, all recovering pictures may not be correctly decoded. As specified in VVC Draft 9, the pictures that are associated with the current GDR picture and have PicOrderCntVal less than recoveryPointPocVal are referred to as recovering pictures of the GDR picture. Recovering pictures may also be referred to herein as recovery point pictures. In VVC Draft 9, a recovery_poc_cnt syntax element specifies a recovery point of decoded pictures in output order. When the current picture is a GDR picture, a video coder (e.g., video encoder 200 or video decoder 300) may derive the variable recoveryPointPocVal as follows:

recoveryPointPocVal=PicOrderCntVal+recovery_poc_cnt

Furthermore, as indicated in VVC Draft 9,

If the current picture is a GDR picture, and there is a picture picA that follows the current GDR picture in decoding order in the CLVS that has PicOrderCntVal equal to recoveryPointPocVal, the picture picA is referred to as the recovery point picture. Otherwise, the first picture in output order that has PicOrderCntVal greater than recoveryPointPocVal in the CLVS is referred to as the recovery point picture. The recovery point picture shall not precede the current GDR picture in decoding order.

Figure 3:
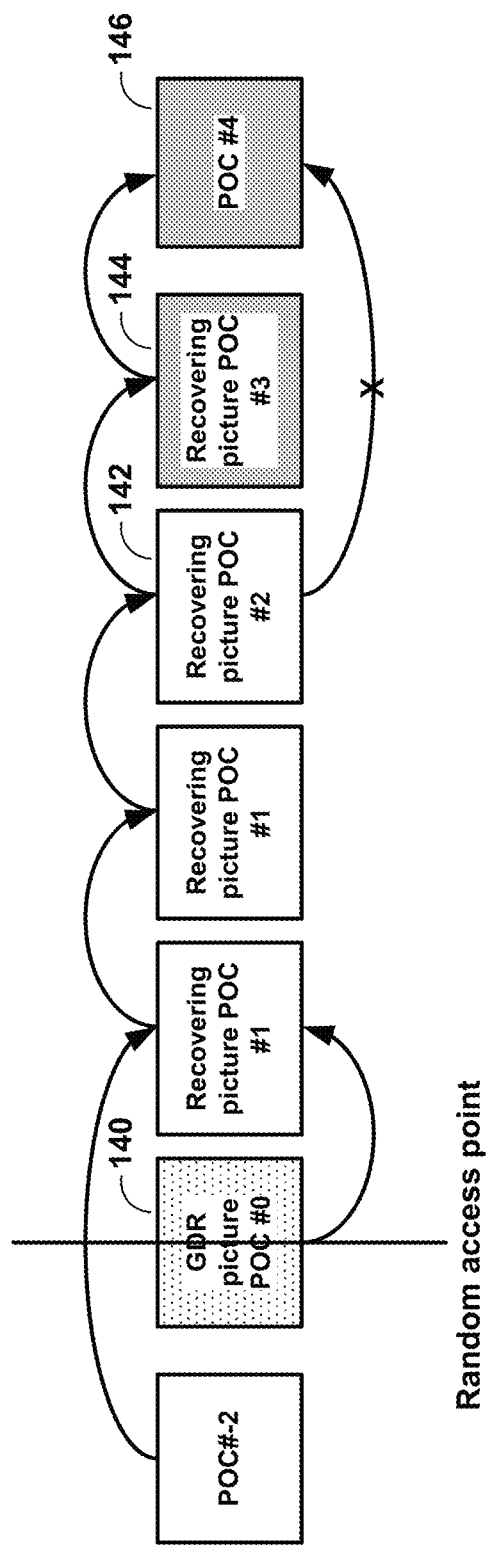
FIG. 3 is a conceptual diagram illustrating a prediction example for a Gradual Decoding Refresh (GDR) picture.

FIG. 3 is a conceptual diagram illustrating a prediction example for a Gradual Decoding Refresh (GDR) picture. FIG. 3 shows an example of a prediction relationship for GDR picture 140. In FIG. 3, a picture having an arrow pointing to another picture indicates that the other picture may use the picture having the origin of the arrow as a reference picture. For example, picture 142 may use picture 144 as a reference picture. In accordance with one or more techniques of this disclosure, to guarantee the pictures that follow the recovery point picture can be correctly decoded, referencing a picture before GDR picture 140 or a picture before the picture with a POC value equal to the recovery POC values should be disallowed. For example, picture 146 having a POC value of 4 should be able to reference recovering picture 144 with a POC of 3, but not reference recovering picture 142 with a POC of 2 (represented by the x'ed out arrow) because POC 2 is before POC 3 and recovering picture 144 is a recovering picture. In one example, the prediction constraint is specified as below:

When the current picture follows a recovery point picture having the same value of nuh_layer_id in both decoding order and output order, there shall be no picture referred to by an active entry in RefPicList[0] or RefPicList[1] that precedes that recovery point picture in output order or decoding order.

In another example, the prediction constraint may be specified as below:

When the current picture follows a recovery point picture having the same value of nuh_layer_id in both decoding order and output order, there shall be no picture referred to by an entry in RefPicList[0] or RefPicList[1] that precedes that recovery point picture in output order or decoding order.

In the example of FIG. 3, picture 146 with POC 4 shall not reference any picture before recovering picture 144 because these recovering pictures may not be correctly decoded when the random access occurred at the GDR picture.

An additional constraint to further ensure the inter-layer reference picture is decodable is specified as follows:

When the current picture follows a recovery point picture having the same value of nuh_layer_id in both decoding order and output order, there shall be no picture referred to by an ILRP active entry in RefPicList[0] or RefPicList[1] that precedes that recovery point picture in output order or decoding order of the associated GDR picture with nuh_layer_id equal to refPicLayerId.

Thus, in some examples, a device (e.g., destination device 116 or another device) may obtain a bitstream that includes an encoded representation of the video data and may determine that the bitstream does not conform to a video coding standard based on the bitstream violating a constraint that requires that, when a current picture follows a recovery point picture having the same value of a NAL unit header layer identifier (e.g., nuh_layer_id) in both decoding order and output order, there shall be no picture referred to by an Inter-Layer Reference Prediction (ILRP) active entry in a first reference picture list (e.g., RefPicList[0]) or a second reference picture list (e.g., RefPicList[1] that precedes the recovery point picture in output order or decoding order of an associated Gradual Decoding Refresh (GDR) picture with a NAL unit header layer identifier equal to a reference picture layer identifier (e.g., refPicLayerId).

Similarly, in some examples, video encoder 200 may obtain video data and may encode the video data to generate a bitstream such that the bitstream does not violate a constraint that requires that, when a current picture follows a recovery point picture having the same value of a NAL unit header layer identifier in both decoding order and output order, there shall be no picture referred to by an ILRP active entry in a first reference picture list or a second reference picture list that precedes the recovery point picture in output order or decoding order of an associated GDR picture with a NAL unit header layer identifier equal to a reference picture layer identifier.

A combined constraint may be specified as follows:
When the current picture follows a recovery point picture having the same value of nuh_layer_id in both decoding order and output order, there shall be no picture referred to by an active entry in RefPicList[0] or RefPicList[1] that precedes that recovery point picture in output order or decoding order of the associated GDR picture in the layer with the nuh_layer_id equal to the nuh_layer_id of the reference picture.

Accordingly, in some examples, a device (e.g., destination device 116 or another device) may obtain a bitstream that includes an encoded representation of the video data and may determine that the bitstream does not conform to a video coding standard based on the bitstream violating a constraint that requires that when a current picture follows a recovery point picture having a same value of a NAL unit header layer identifier (e.g., nuh_layer_id) in both decoding order and output order, there shall be no reference picture referred to by an active entry in a first reference picture list (e.g., RefPicList[0]) or a second reference picture list (e.g., RefPicList[1]) that precedes the recovery point picture in output order or decoding order of an associated GDR picture in a layer with a NAL unit header layer identifier equal to a NAL unit header layer identifier of the reference picture.

Similarly, in some examples, video encoder 200 may obtain video data and may encode the video data to generate a bitstream such that the bitstream does not violate a constraint that requires that when a current picture follows a recovery point picture having a same value of a NAL unit header layer identifier (e.g., nuh_layer_id) in both decoding order and output order, there shall be no reference picture referred to by an active entry in a first reference picture list (e.g., RefPicList[0]) or a second reference picture list (e.g., RefPicList[1]) that precedes the recovery point picture in output order or decoding order of an associated GDR picture in a layer with a NAL unit header layer identifier equal to a NAL unit header layer identifier of the reference picture.

The derivation of NumSubLayersInLayerinOLS is now discussed. In VVC Draft 9, the number of sublayers of the k-th layer used as an ILRP for decoding the i-th layer is indicated by max_tid_il_ref_pics_plus1[i][k] when the k-th layer is the direct dependent layer of the i-th layer. When the k-th layer is not the direct dependent layer of the i-th layer, but both layers are included in the same output layer set (OLS), the k-th layer is either the output layer or the indirect dependent layer of the i-th layer. When the k-th layer is the output layer, the variable NumSubLayersInLayerinOLS is derived to be equal to vps_max_sub_layers_minus1 plus 1. Otherwise, the value of NumSubLayersInLayerinOLS is derived based on the OLS mode and the layer dependency. For example, video encoder 200 or video decoder 300 may derive the variable NumSubLayersInLayerinOLS.

Figure 4B:
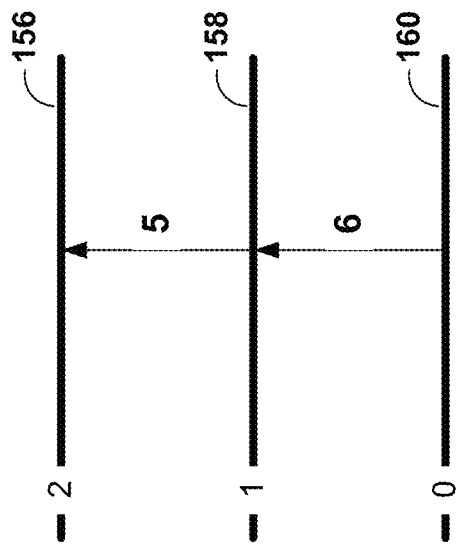
FIGS. 4A-4B are conceptual diagrams illustrating example sublayers used for inter-layer reference prediction.
Figure 4A:
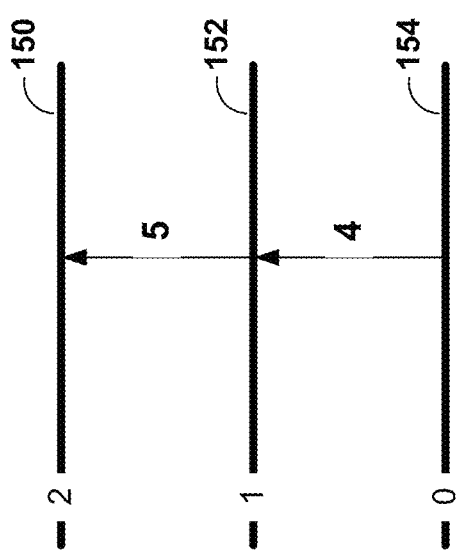

FIGS. 4A-4B are conceptual diagrams illustrating example sublayers used for inter-layer reference prediction. FIGS. 4A-4B show several examples of numbers of sublayers used for ILRP between different layers in an OLS where the $2^{nd}$ layer is the output layer. For example, FIG. 4A depicts 0 layer 154, $1^{st}$ layer 152, and $2^{nd}$ layer 150. FIG. 4B depicts 0 layer 160, $1^{st}$ layer 158, and $2^{nd}$ layer 156. According to VVC Draft 9, a video coder (e.g., video encoder 200 or video decoder 300) derives the NumSubLayersInLayerinOLS[i][k] as the minimum sublayers of NumSubLayersInLayerinOLS[i][m] and NumSubLayersInLayerinOLS[m][k] when the k-th layer is the direct dependent layer of the m-th layer, where m is less than or equal to i but greater than k.

In the case shown in FIG. 4A, the value of NumSubLayersInLayerinOLS[2][0] is derived to be equal to 4 as the minimum value of NumSubLayersInLayerinOLS[2][1] and NumSubLayersInLayerinOLS[1][0] is derived to be equal to 4. However, in the case of FIG. 4B, the value of NumSubLayersInLayerinOLS[2][0] is derived to be equal to 5, and 5 sublayers of 0 layer 160 is not sufficient to decode $1^{st}$ layer 158 which is used to decode $2^{nd}$ layer 156 for output.

In accordance with a technique of this disclosure, a proposed derivation process derives the NumSubLayersInLayerinOLS[i][k] with the maximum sublayers of NumSubLayersInLayerinOLS[m][k] when the k-th layer is the direct dependent layer of the m-th layer, where m is less than or equal to i but greater than k.

In accordance with the techniques of this disclosure, the derivation process of NumSubLayersInLayerinOLS may be updated as follows. The deleted text is marked with <d> . . . </d> tags and inserted text is marked with <i> . . . </i> tags.

The variable NumOutputLayersInOls[ i ], specifying the number of output layers in the i-th OLS, the variable NumSubLayersInLayerInOLS[ i ][ j ], specifying the number of sublayers in the j-th layer in the i-th OLS, the variable OutputLayerIdInOls[ i ][ j ], specifying the nuh_layer_id value of the j-th output layer in the i-th OLS, and the variable LayerUsedAsOutputLayerFlag[ k ], specifying whether the k-th layer is used as an output layer in at least one OLS, are derived as follows:
NumOutputLayersInOls[ 0 ] = 1

```
OutputLayerIdInOls[ 0 ][ 0 ] = vps_layer_id[ 0 ]
NumSubLayersInLayerInOLS[ 0 ][ 0 ] = vps_max_sub_layers_minus1 + 1
LayerUsedAsOutputLayerFlag[ 0 ] = 1
for( i = 1, i <= vps_max_layers_minus1; i++ ) {
   if( vps_each_layer_is_an_ols_flag || vps_ols_mode_idc < 2 )
      LayerUsedAsOutputLayerFlag[ i ] = 1
   else /*( !vps_each_layer_is_an_ols_flag && vps_ols_mode_idc = = 2 ) */
      LayerUsedAsOutputLayerFlag[ i ] = 0
}
for( i = 1; i < TotalNumOlss; i++ )
   if( vps_each_layer_is_an_ols_flag || vps_ols_mode_idc = = 0 ) {
      NumOutputLayersInOls[ i ] = 1
      OutputLayerIdInOls[ i ][ 0 ] = vps_layer_id[ i ]
      if( vps_each_layer_is_an_ols_flag )
         NumSubLayersInLayerInOLS[ i ][ 0 ] = vps_max_sub_layers_minus1 + 1
      else {
         NumSubLayersInLayerInOLS[ i ][ i ] = vps_max_sub_layers_minus1 + 1
         for( k = i − 1, k >= 0; k− − ) {
            NumSubLayersInLayerInOLS[ i ][ k ] = 0
            for( m = k + 1; m <= i; m++ ) {
               <d>maxSublayerNeeded = min( NumSubLayersInLayerInOLS[ i ][ m ],
vps_max_tid_il_ref_pics_plus1[ m ][ k ] )</d>
               if( vps_direct_ref_layer_flag[ m ][ k ] <d>&&
NumSubLayersInLayerInOLS[ i ][ k ] < maxSublayerNeeded</d> )
                  <d>NumSubLayersInLayerInOLS[ i ][ k ] = maxSublayerNeeded</d>
                  <i>NumSubLayersInLayerInOLS[i][k] = max(
NumSubLayersInLayerInOLS[i][k], max_tid_il_ref_pics_plus1[m][k] )</i>
            }
         }
      } else if( vps_ols_mode_idc = = 1 ) {
         NumOutputLayersInOls[ i ] = i + 1
         for( j = 0; j < NumOutputLayersInOls[ i ]; j++ ) {
            OutputLayerIdInOls[ i ][ j ] = vps_layer_id[ j ]
            NumSubLayersInLayerInOLS[ i ][ j ] = vps_max_sub_layers_minus1 + 1
         }
      } else if( vps_ols_mode_idc = = 2 ) {
         for( j = 0; j <= vps_max_layers_minus1; j++ ) {
            layerIncludedInOlsFlag[ i ][ j ] = 0
            NumSubLayersInLayerInOLS[ i ][ j ] = 0
         }
         highestIncludedLayer = 0
         numLayerInOls = 0
         for( k = 0, j = 0; k <= vps_max_layers_minus1; k++ )
(40)
            if( vps_ols_output_layer_flag[ i ][ k ] ) {
               layerIncludedInOlsFlag[ i ][ k ] = 1
               highestIncludedLayer = k
               numLayerInOls++
               LayerUsedAsOutputLayerFlag[ k ] = 1
               OutputLayerIdx[ i ][ j ] = k
               OutputLayerIdInOls[ i ][ j++ ] = vps_layer_id[ k ]
               NumSubLayersInLayerInOLS[ i ][ k ] = vps_max_sub_layers_minus1 + 1
            }
         NumOutputLayersInOls[ i ] = j
         for( j = 0; j < NumOutputLayersInOls[ i ]; j++ ) {
            idx = OutputLayerIdx[ i ][ j ]
            for( k = 0; k < NumRefLayers[ idx ]; k++ ) {
               if (!layerIncludedInOlsFlag[ i ][ RefLayerIdx[ idx ][ k ] ])
                  numLayerInOls++
               layerIncludedInOlsFlag[ i ][ RefLayerIdx[ idx ][ k ] ] = 1
            }
         }
         for( k = highestIncludedLayer − 1; k >= 0; k− − )
            if( layerIncludedInOlsFlag[ i ][ k ] && !vps_ols_output_layer_flag[ i ][ k ] )
               for( m = k + 1; m <= highestIncludedLayer; m++ ) {
                  <d>maxSublayerNeeded = min( NumSubLayersInLayerInOLS[ i ][ m ],
vps_max_tid_il_ref_pics_plus1[ m ][ k ] )</d>
                  if (vps_direct_ref_layer_flag[m][k] && layerIncludedInOlsFlag[i][m]
<d>&& NumSubLayersInLayerInOLS[i][k] < maxSublayerNeeded</d> )
                     <d>NumSubLayersInLayerInOLS[ i ][ k ] = maxSublayerNeeded</d>
                     <i>NumSubLayersInLayerInOLS[ i ][ k ] =
max(NumSubLayersInLayerInOLS[ i ][ k ], max_tid_il_ref_pics_plus1[m][k])</i>
               }
      }
```

Semantic constraints on general constraint flags are now discussed. A general constraint flag is used to indicate that a particular coding feature or tool is restricted or disabled in a bitstream, and the value of one particular constraint flag may be determined by the value of other constraint flags. The following semantic constraints apply to general constraint information syntax elements (e.g., general constraint flags). Video encoder 200 or video decoder 300 may apply such constraints.

When intra_only_constraint_flag is 1, the value of no_ref_pic_resampling_constraint_flag, all_layers_independent_constraint_flag and no_mixed_nalu_types_in_pic_constraint_flag shall be equal to 1.

When no_ref_pic_resampling_constraint_flag is 1, the value of no_res_change_in_clvs_constraint_flag shall be equal to 1.

When one_subpic_per_pic_constraint_flag, the value of no_mixed_nalu_types_in_pic_constraint_flag shall be equal to 1

When no_cra_constraint_flag is 1, the value of no_rasl_constraint_flag shall be equal to 1.

The value of no_idr_constraint_flag, no_cra_constraint_flag, and no_gdr_constraint_flag shall not be all equal to 1.

In another example, the following semantic constraints apply to general constraint information syntax elements (e.g., general constraint flags).

When intra_only_constraint_flag is 1, the value of no_ref_pic_resampling_constraint_flag, all_layers_independent_constraint_flag no_mixed_nalu_types_in_pic_constraint_flag, no_trail_constraint_flag, no_stsa_constraint_flag, no_rasl_constraint_flag, no_radl_constraint_flag and no_gdr_constraint_flag shall be equal to 1.

When no_ref_pic_resampling_constraint_flag is 1, the value of no_res_change_in_clvs_constraint_flag shall be equal to 1.

When one_subpic_per_pic_constraint_flag is 1, the value of no_mixed_nalu_types_in_pic_constraint_flag shall be equal to 1

When no_cra_constraint_flag is 1, the value of no_rasl_constraint_flag shall be equal to 1.

The value of no_idr_constraint_flag, no_cra_constraint_flag, and no_gdr_constraint_flag shall not be all equal to 1.

When no_affine_motion_constraint_flag is equal to 1, the value of no_prof_constraint_flag shall be equal to 1

When max_chroma_format_constraint_idc is equal to 0, the value of no_chroma_qp_offset_contraint_flag shall be equal to 1.

When intra_only_constraint_flag is equal to 1, the value of no_sbt_constraint_flag shall be equal to 1.

When no_transform_skip_constraint_flag is equal to 1, the value of no_bdpcm_constraint_flag shall be equal to 1.

When one_subpic_per_pic_constraint_flag is equal to 1, sps_num_subpics_minus1 shall be equal to 0

When one_tile_per_pic_constraint_flag and one_slice_per_pic_constraint_flag both are equal to 1, pps_no_pic_partition_flag shall be 1

Additional general constraint flags are now discussed. In accordance with one or more techniques of this disclosure, a number of additional general constraint flags may be defined. Any of, or any combination of, the following additional general constraint flags may be defined as follows:

general_non_HRD_constraint_flag equal to 1 specifies that there shall not be any Hypothetical Reference Decoder (HRD) related SEI messages (BP, PT, DU information SEI messages) present in the bitstream of the OlsInScope. general_non_HRD_constraint_flag equal to 0 does not impose such a constraint.

general_non_dependent_RAP_constraint_flag equal to 1 specifies that there shall not be any Dependent Random Access Point indication SEI message present in the bitstream of the OlsInScope.

General_non_dependent_RAP_constraint_flag equal to 0 does not impose such a constraint.

general_non_omnidirectional_video_constraint_flag equal to 1 specifies that there shall not be any omnidirectional video specific SEI messages present in the bitstream of the OlsInScope.

general_non_omnidirectional_video_constraint_flag equal to 0 does not impose such a constraint.

no_VUI_constraint_flag equal to 1 specifies sps_vui_parameters_present_flag is equal to 0, no_VUI_constraint_flag equal to 0 does not impose such a constraint. In VVC Draft 9, sps_vui_parameters_present_flag (or a vui_parameters_present_flag in an SPS) equal to 1 specifies that the syntax structure vui_parameters( ) is present in the SPS RBSP syntax structure. vui_parameters_present_flag equal to 0 specifies that the syntax structure vui_parameters( ) is not present in the SPS RBSP syntax structure.

max_layers_constraint_idc specifies that vps_max_layers_minus1 shall be in the range of 0 to max_layers_idc−1, inclusive. In VVC Draft 9, vps_max_layers_minus1 plus 1 specifies the maximum allowed number of layers in each CVS referring to the VPS. Furthermore, in some examples, when single_layer_constraint_flag is equal to 1, max_layers_constraint_idc shall be equal to 0.

max_sublayers_constraint_idc specifies that vps_max_sublayers_minus1 shall be in the range of 0 to max_sublayers_idc−1, inclusive. In VVC Draft 9, vps_max_sublayers_minus1 plus 1 specifies the maximum number of temporal sublayers that may be present in a layer in each CVS referring to the VPS. In VVC Draft 9, the value of vps_max_sublayers_minus1 shall be in the range of 0 to 6, inclusive.

max_subpics_constraint_idc specifies that sps_num_subpics_minus1 shall be in the range of 0 to max_subpics_idc−1, inclusive. In VVC Draft 9, sps_num_subpics_minus1 plus 1 specifies the number of subpictures in each picture in the CLVS. The value of sps_num_subpics_minus1 shall be in the range of 0 to Ceil (pic_width_max_in_luma_samples÷CtbSizeY)*Ceil (pic_height_max_in_luma_samples÷CtbSizeY)−1, inclusive. When not present, the value of sps_num_subpics_minus1 is inferred to be equal to 0. In some examples, when one_subpic_per_pic_constraint_flag is equal to 1, max_subpics_constraint_idc shall be equal to 0.

no_pic_partition_constraint_flag equal to 1 specifies that pps_no_pic_partition_flag shall be equal to 1. no_pic_partition_constraint_flag equal to 0 does not impose such constraint. When no_pic_partition_constraint_flag is equal to 1, the value of one_tile_per_pic_constraint_flag, one_slice_per_pic_constraint_flag and one_subpic_per_pic_constraint_flag shall be equal to 1. In VVC Draft 9, pps_no_pic_partition_flag equal to 1 specifies that no picture partitioning is applied to each picture referring to the PPS. pps_no_pic_partition_flag equal to 0 specifies each picture referring to the PPS may be partitioned into more than one tile or slice.

no_rectangular_slice_constraint_flag equal to 1 specifies that pps_rect_slice_flag shall be equal to 0, no_rectangular_slice_constraint_flag equal to 0 does not impose such a constraint.

no_raster_scan_slice_constraint_flag equal to 1 specifies that pps_rect_slice_flag shall be equal to 1, no_raster_scan_slice_constraint_flag equal to 0 does not impose such a constraint. When one_tile_per_pic_constraint_flag is 1 or one_subpic_per_pic_constraint_flag is 1, the value of no_raster_scan_slice_constraint_flag shall be equal to 1.

one_slice_per_subpicture_constraint_flag equal to 1 specifies that the value of pps_single_slice_per_subpic_flag shall be equal to 1, one_slice_per_subpicture_constraint_flag equal to 0 does not impose such a constraint.

For example, video encoder 200 or video decoder 300 may determine a value of a first syntax element (e.g., no_rectangular_slice_constraint_flag) indicative of whether a first constraint is applicable, the first constraint being that rectangular slices are not used for a first plurality of pictures (e.g., no rectangular slices are permitted). Video encoder 200 or video decoder 300 may code the first plurality of pictures of the video data in accordance with the value of the first syntax element code a picture in accordance with the value of the first syntax element. For example, video encoder 200 may encode the first plurality of pictures in accordance with the value of the first syntax element or video decoder 300 may decode the first plurality of pictures in accordance with the value of the first syntax element. In some examples, the value of the first syntax element indicates that the first constraint is applicable, and video encoder 200 or video decoder 300 may, based on the value of the first syntax element indicating that the first constraint is applicable, determine that a value associated with a second syntax element (e.g., pps_rect_slice_flag) for the plurality of pictures equals 0, wherein the value of 0 for the second syntax element indicates that rectangular slices are not used for each picture among the plurality of pictures to which a picture parameter set is applicable.

For example, video encoder 200 or video decoder 300 may determine a value of a third syntax element (e.g., one_slice_per_subpicture_constraint_flag) indicative of whether a second constraint is applicable, the second constraint being that each subpicture among a second plurality of pictures must only contain one slice. Video encoder 200 or video decoder 300 may code each subpicture among the second plurality of pictures in accordance with the value of the third syntax element. For example, video encoder 200 may encode each subpicture among the second plurality of pictures in accordance with the value of the third syntax element or video decoder 300 may decode each subpicture among the second plurality of pictures in accordance with the value of the third syntax element. In some examples, the value of the third syntax element indicates that the second constraint is applicable, and video encoder 200 or video decoder 300 may, based on the value of the third syntax element indicating that the second constraint is applicable, determine that a value associated with a fourth syntax element indicates that each subpicture among the second plurality of pictures to which a picture parameter set is applicable only contains one slice. In some examples, the value of the third syntax element is equal to 1 and the value of the fourth syntax element is equal to 1.

In another example, the general constraint information flags may be categorized into several syntax sub-structures and each sub-structure may be conditioned by a corresponding present flag. As a result, the relevant flags may be grouped together. The profile, tier and level may specify the default value of each general constraint flag and bitstreams complying with the profile, tier and level may not have to carry some or all general constraint flags, thereby saving signaling bandwidth and processing power.

For example, there may be three categories for the general constraint information, general_capability_constraint_info( ), general_coding_tool_constraint_info( ) and general_nal_unit_type_constraint_info( ). The general_capability_constraint_info( ) contains those flags specifying the decoding capability constraints, the general_coding_tool_constraint_info( ) contains those flags specifying the coding tool constraints, and the general_nal_unit_type_constraint_info( ) contains those flags specifying the availability of NAL unit types in the bitstream constraints.

Each sub-structure signaling may be conditioned by a present flag as shown in Table 1. The general constraint sub-structure is present when the corresponding present flag is 1; otherwise, the value of general constraint flags in the sub-structure is inferred to be equal to a default value, such as 0 or another value, when corresponding present flag is 0.

TABLE 1 general constraint information syntax

| general_constraint_info( ) { | Descriptor |
|---|---|
| general_capability_constraint_present_flag | u(1) |
| if(general_capability_constraint_present_flag ) | |
| general_capability_constraint_info( ) | |
| general_coding_tool_constraint_present_flag | u(1) |
| if(general_coding_tool_present flag ) | |
| general_coding_tool_constraint_info( ) | |
| general_nal_unit_type_constraint_present_flag | u(1) |
| if(general_nal_unit_type_present_flag ) | |
| general_nal_unit_type_constraint_info( ) | |
| while( !byte_aligned( ) ) | |
| gci_alignment_zero_bit | f(1) |
| gci_num_reserved_bytes | u(8) |
| for( i = 0; i < gci_num_reserved_bytes; i++ ) | |
| gci_reserved_byte[ i ] | u(8) |
| } | |

Table 2, Table 3, and Table 4 show the constraint sub-structure syntax for the existing general constraint flags.

TABLE 2 general capability constraint information

| general_capability_constraint_info( ) { | Descriptor |
|---|---|
| general_non_packed_constraint_flag | u(1) |
| general_frame_only_constraint_flag | u(1) |
| general_non_projected_constraint_flag | u(1) |
| general_one_picture_only_constraint_flag | u(1) |
| intra_only_constraint_flag | u(1) |
| max_bitdepth_constraint_idc | u(4) |
| max_chroma_format_constraint_idc | u(2) |
| single_layer_constraint_flag | u(1) |
| all_layers_independent_constraint_flag | u(1) |
| no_ref_pic_resampling_constraint_flag | u(1) |
| no_res_change_in_clvs_constraint_flag | u(1) |
| one_tile_per_pic_constraint_flag | u(1) |
| pic_header_in_slice_header_constraint_flag | u(1) |
| one_slice_per_pic_constraint_flag | u(1) |
| one_subpic_per_pic_constraint_flag | u(1) |
| no_mixed_nalu_types_in_pic_constraint_flag | u(1) |
| } | |

TABLE 3 general coding tool constraint information

| general_coding_tool_constraint_info( ) { | Descriptor |
|---|---|
| no_qtbtt_dual_tree_intra_constraint_flag | u(1) |
| no_partition_constraints_override_constraint_flag | u(1) |
| no_sao_constraint_flag | u(1) |
| no_alf_constraint_flag | u(1) |
| no_ccalf_constraint_flag | u(1) |
| no_joint_cbcr_constraint_flag | u(1) |
| no_mrl_constraint_flag | u(1) |
| no_isp_constraint_flag | u(1) |
| no_mip_constraint_flag | u(1) |
| no_ref_wraparound_constraint_flag | u(1) |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_dmvr_constraint_flag | u(1) |
| no_cclm_constraint_flag | u(1) |
| no_mts_constraint_flag | u(1) |
| no_sbt_constraint_flag | u(1) |
| no_lfnst_constraint_flag | u(1) |
| no_affine_motion_constraint_flag | u(1) |
| no_mmvd_constraint_flag | u(1) |
| no_smvd_constraint_flag | u(1) |
| no_prof_constraint_flag | u(1) |
| no_bcw_constraint_flag | u(1) |
| no_ibc_constraint_flag | u(1) |
| no_ciip_constraint_flag | u(1) |
| no_gpm_constraint_flag | u(1) |
| no_ladf_constraint_flag | u(1) |
| no_transform_skip_constraint_flag | u(1) |
| no_bdpcm_constraint_flag | u(1) |
| no_palette_constraint_flag | u(1) |
| no_act_constraint_flag | u(1) |
| no_lmcs_constraint_flag | u(1) |
| no_cu_qp_delta_constraint_flag | u(1) |
| no_chroma_qp_offset_constraint_flag | u(1) |
| no_dep_quant_constraint_flag | u(1) |
| no_sign_data_hiding_constraint_flag | u(1) |
| no_tsrc_constraint_flag | u(1) |
| } | |

TABLE 4 general nal unit type (NUT) constraint syntax

| general_nut_constraint_info( ) { | Descriptor |
|---|---|
| no_trail_constraint_flag | u(1) |
| no_stsa_constraint_flag | u(1) |
| no_rasl_constraint_flag | u(1) |
| no_radl_constraint_flag | u(1) |
| no_idr_constraint_flag | u(1) |
| no_cra_constraint_flag | u(1) |
| no_gdr_constraint_flag | u(1) |
| no_aps_constraint_flag | u(1) |
| } | |

In the examples above, OlsInScope refers to one or more OLSs that are in scope. In VVC Draft 9, when a profile_tier_level( ) syntax structure is included in a VPS, OlsInScope is one or more OLSs specified by the VPS. When a profile_tier_level( ) syntax structure is included in an SPS, the OlsInScope is the OLS that includes only the layer that is the lowest layer among the layers that refer to the SPS, and this lowest layer is an independent layer.

Semantic constraints are now discussed. Video encoder 200 may signal a maximum number of sub-layers in a VPS and SPS. However, when all layers have the same number of sub-layers, the maximum number of sub-layers signaled in the VPS and SPS can be different, which may create a problem for video decoder 300 in determining the correct number of sub-layers. To avoid this ambiguity, a constraint may be added to require the number of sub-layers signaled in VPS and SPS be the same. In one example, the semantic constraint of a syntax element, sps_max_sublayers_minus1, is imposed as follows:

When vps_video_parameter_set_id is greater than 0 and vps_all_layers_same_num_sublayers_flag is equal to 1, the value of sps_max_sublayers_minus1 shall be equal to the value of vps_max_sublayers_minus1.

When sps_video_parameter_set_id is greater than 0 and vps_all_layers_same_num_sublayers_flag is equal to 1, the value of sps_max_sublayers_minus1 shall be equal to the value of vps_max_sublayers_minus1.

The value of pps_single_sliceper_subpic_flag is inferred to be equal to 1 when pps_single_sliceper_subpic_flag is not present in a corresponding PPS. pps_single_sliceper_subpic_flag is not present when pps_rect_slice_flag is equal to 1. However, it does not make sense to infer the value of pps_single_sliceper_subpic_flag to be equal to 1 when there is no subpicture available. In accordance with the techniques of this disclosure, the semantic constraint of pps_single_sliceper_subpic_flag can be updated as follows:

pps_single_slice_per_subpic_flag equal to 1 specifies that each subpicture consists of one and only one rectangular slice. pps_single_sliceper_subpic_flag equal to 0 specifies that each subpicture may consist of one or more rectangular slices. When not present, the value of pps_single_sliceper_subpic_flag is inferred to be equal to the value of pps_no_pic_partition_flag.

Syntax elements signaling conditions are now discussed. The SPS syntax element, sps_num_subpics_minus1, may not be explicitly signaled when the picture width and height are less than CtbSizeY as shown in Table 5 below. The value of sps_num_subpics_minus1 can be inferred to be equal to 0.

In another example, a bitstream conformance requirement may be imposed that the value of sps_num_subpics_minus1 shall be equal to 0 when maximum picture width (sps_pic_width_max_in_luma_samples) and/or maximum picture height (sps_pic_height_max_in_luma_samples) are less than or equal to the CtbSizeY.

One implementation example is shown in the next syntax table with added conditions indicated with <!> . . . </!> tags.

TABLE 5

Proposed SPS RBSP

| seq_parameter_set_rbsp( ) { | Descriptor |
|---|---|
| sps_seq_parameter_set_id | u(4) |
| ... | |
| sps_subpic_info_present_flag | u(1) |
| if( sps_subpic_info_present_flag ) { | |
| <!> if( sps_pic_width_max_in_luma_samples > CtbSizeY \|\| sps_pic_height_max_in_luma_samples > CtbSizeY )</!> | |
| sps_num_subpics_minus1 | ue(v) |
| ... | |
| } | |
| } | | sps_pic_width_max_in_luma_samples is a syntax element indicating the maximum width, in units of luma samples, of each decoded picture referring to an SPS. pic_height_max_in_luma_samples specifies the maximum height, in units of luma samples, of each decoded picture referring to the SPS.

The PPS syntax elements, pps_num_exp_tile_columns_minus1 and pps_num_exp_tile_rows_minus1, may not be explicitly signaled when the picture width or the height is less than CtbSizeY as shown in Table 6 below. For example, video encoder 200 may refrain from signaling pps_num_exp_tile_columns_minus1 and pps_num_exp_tile_rows_minus1. The syntax element pps_num_exp_tile_columns_minus1, plus 1, specifies the number of explicitly provided tile column widths. The syntax element pps_num_exp_tile_rows_minus1, plus 1, specifies the number of explicitly provided tile row heights. In another example, a semantic constraint may be imposed that it is a bitstream conformance requirement that the value of pps_num_exp_tile_columns_minus1 shall be equal to 0 when the value of pps_pic_width_in_luma_samples is less than or equal to CtbSizeY. Furthermore, in this example, it is a bitstream conformance requirement that the value of pps_num_exp_tile_rows_minus1 shall be equal to 0 when the value of pps_pic_height_in_luma_samples is less than or equal to CtbSizeY.

TABLE 6

Proposed PPS RBSP

| pic_parameter_set_rbsp( ) { | Descriptor |
|---|---|
| pps_pic_parameter_set_id | u(6) |
| pps_seq_parameter_set_id | u(4) |
| pps_mixed_nalu_types_in_pic_flag | u(1) |
| pps_pic_width_in_luma_samples | ue(v) |
| pps_pic_height_in_luma_samples | ue(v) |
| ... | |
| if( !pps_no_pic_partition_flag ) { | |
|   pps_log2_ctu_size_minus5 | u(2) |
|   <!> if( pps_pic_width_in_luma_samples > CtbSizeY )</!> | |
|     pps_num_exp_tile_columns_minus1 | ue(v) |
|   <!> if( pps_pic_height_in_luma_samples > CtbSizeY )</!> | |
|     pps_num_exp_tile_rows_minus1 | ue(v) |
|   ... | |
| } | |
| } | |

In another example, the syntax elements, pps_tile_column_width_minus1[i] and pps_tile_row_height_minus1[i], may also be conditioned as shown in Table 7 below. When the picture width is less than or equal to a CTB size, the tile column width, pps_tile_column_width_minus1 [0], is equal to PicWidthInCtbsY−1. When the picture height is less than or equal to a CTB size, the tile row height, pps_tile_row_height_minus1 [0], is equal to PicHeightInCtbsY−1.

TABLE 7

Proposed PPS RBSP

| pic_parameter_set_rbsp( ) { | Descriptor |
|---|---|
| pps_pic_parameter_set_id | u(6) |
| pps_seq_parameter_set_id | u(4) |
| pps_mixed_nalu_types_in_pic_flag | u(1) |
| pps_pic_width_in_luma_samples | ue(v) |
| pps_pic_height_in_luma_samples | ue(v) |
| ... | |
| if( !pps_no_pic_partition_flag ) { | |
|   pps_log2_ctu_size_minus5 | u(2) |
|   <i>if( pps_pic_width_in_luma_samples > CtbSizeY ) {</i> | |
|     pps_num_exp_tile_columns_minus1 | ue(v) |
|     for( i = 0; i <= pps_num_exp_tile_columns_minus1; i++ ) | |
|       pps_tile_column_width_minus1[ i ] | ue(v) |
|   <i>}</i> | |
|   <i>if( pps_pic_height_in_luma_samples > CtbSizeY ) {</i> | |
|     pps_num_exp_tile_rows_minus1 | ue(v) |
|     for( i = 0; i <= pps_num_exp_tile_rows_minus1; i++ ) | |
|       pps_tile_row_height_minus1[ i ] | ue(v) |
|   <i>}</i> | |
| } | |

When there is only one CTB in a picture, the picture cannot be partitioned into multiple tiles or slices, so no syntax elements should be allow to be signaled or indicate the picture partitioning in this case which would save signaling bandwidth and processing power.

To ensure no picture partitioning, in one example, a semantic constraint may be imposed on syntax element, pps_no_pic_partition_flag, as follows:

It is a bitstream conformance requirement that the value of pps_no_pic_partition_flag shall be equal to 1 when the value of pps_pic_width_in_luma_samples and pps_pic_height_in_luma_samples are both less than or equal to the CtbSizeY.

The PPS syntax element, pps_tile_jdx_delta_present_flag, may not be explicitly signaled when there is only one tile in a picture as shown in Table 8 below. In VVC Draft 9, tile_idx_delta_present_flag equal to 0 specifies that tile_idx_delta[i] syntax elements are not present in the PPS and all pictures referring to the PPS are partitioned into rectangular slice rows and rectangular slice columns in slice raster order. tile_idx_delta_present_flag equal to 1 specifies that tile_idx_delta[i] syntax elements may be present in the PPS and all rectangular slices in pictures referring to the PPS are specified in the order indicated by the values of the tile_idx_delta[i] in increasing values of i. When not present, the value of tile_idx_delta_present_flag is inferred to be equal to 0.

In another example, the semantic constraint may be imposed to pps_tile_idx_delta_present_flag as follows:

It is a bitstream conformance requirement that the value of pps_tile_idx_delta_present_flag shall be equal to 0 when there is only one tile in the picture.

TABLE 8

Proposed PPS RBSP

| pic_parameter_set_rbsp( ) { | Descriptor |
|---|---|
| ... | |
| if( pps_rect_slice_flag | |
| && !pps_single_slice_per_subpic_flag ) { | |
|   pps_num_slices_in_pic_minus1 | ue(v) |
|   if( pps_num_slices_in_pic_minus1 > 1 <!>&&</!> | |

TABLE 8-continued

Proposed PPS RBSP

| pic_parameter_set_rbsp( ) { | Descriptor |
|---|---|
| NumTilesInPic > 1</!> ) | |
|     pps_tile_idx_delta_present_flag | u(1) |
|     ... | |
|     if( pps_tile_idx_delta_present_flag && i < pps_num_slices_in_pic_minus1 ) | |
|         pps_tile_idx_delta_val[ i ] | se(v) |
|     } | |
|     ... | |
| } | |

In VVC Draft 9, the syntax element pps_num_slices_in_pic_minus1 (which may also be labeled num_slices_in_pic_minus1 or otherwise), plus 1, specifies the number of rectangular slices in each picture referring to the PPS. NumTilesInPic is equal to the number of tiles in a picture (e.g., the number of tile columns*the number of tile rows).

In another example, when the picture width is less than or equal to CtbSizeY, all slices share the same width and the pps_tile_idx_delta_val[i] syntax elements may not be explicitly signaled and the tile index of the tile containing the first CTU in the slice can be derived. For example, video decoder 300 may derive the tile index of the tile containing the first CTU in the slice. When the picture height is less than or equal to CtbSizeY, all slices share the same height, the pps_tile_idx_delta_val[i] syntax elements may not be explicitly signaled and the tile index of the tile containing the first CTU in the slice can be derived.

The signaling condition on pps_tile_idx_delta_present_flag is shown in Table 9.

TABLE 9

PPS RBSP

| pic_parameter_set_rbsp( ) { | Descriptor |
|---|---|
|   ... | |
|   if( pps_rect_slice_flag && !pps_single_slice_per_subpic_flag ) { | |
|     pps_num_slices_in_pic_minus1 | ue(v) |
|     if( pps_num_slices_in_pic_minus1 > 1 <i>&& | |
|         NumTilesInPic > 1 && | |
|         pps_pic_width_in_luma_samples > CtbSizeY && | |
|         pps_pic_height_in_luma_samples > CtbSizeY</!> ) | |
|     pps_tile_idx_delta_present_flag | u(1) |
|     ... | |
|     if( pps_tile_idx_delta_present_flag && i < pps_num_slices_in_pic_minus1 ) | |
|         pps_tile_idx_delta_val[ i ] | se(v) |
|     } | |
|   ... | |
| } | |

The semantic constraint may be imposed on pps_tile_idx_delta_present_flag as follows.

When NumTilesInPic is equal to 1, or the value of ppspic_width_in_luma_samples is less than or equal to CtbSizeY, or the value of ppspic_height_in_luma_samples is less than or equal to CtbSizeY, the value of pps_tile_idx_delta_present_flag shall be equal to 0.

A hypothetical reference decoder (HRD) is now discussed. In VVC Draft 9, the picture header (PH) NAL unit type is not present in Type I bitstreams and Type I bitstreams contain only video coding layer (VCL) NAL units. PHs may be essential for VCL NAL parsing and decoding, so PH NAL units should be included into the Type I bitstream along with VCL NALs. For example, video decoder 300 may require PH NAL units to parse and decode VCL NAL units.

For example, PH NALs should be included in the HRD process. In one example, PH NALs may be included in Type I bitstream when present as set forth below as indicated with tags <!> and </!>:

The first type, called a Type I bitstream, is a NAL unit stream containing only the VCL NAL units <!> when a VCL NAL unit has sh_picture_header_in_slice_header_flag equal to 1, or the PH NAL units and the VCL NAL units following the PH NAL unit</!>, and NAL units with nal_unit_type equal to FD NUT (filler data NAL units) for all AUs in the bitstream.

In VVC Draft 9, sh_picture_header_in_slice_header_flag equal to 1 specifies that the PH syntax structure is present in the slice header. sh_picture_header_in_slice_header_flag equal to 0 specifies that the PH syntax structure is not present in the slice header.

In another example, PH NAL units shall be conveyed to the HDR when present indicated with <!> . . . </!> tags below:

All DCI NAL units, when available, all VPSs, SPSs, PPSs, <!>PHs</!> and APSs referred to in the VCL NAL units, and appropriate BP, PT, and DU information SEI messages shall be conveyed to the HRD, in a timely manner, either in the bitstream (by non-VCL NAL units), or by other means not specified in this Specification.

In Annexes C and D, the specification for "presence" of non-VCL NAL units that contain DCI NAL units, VPSs, SPSs, PPSs, APSs, <!>PHs, </!> BP SEI messages, PT SEI messages, or DU information SEI messages, is also satisfied when those NAL units (or just some of them) are conveyed to decoders (or to the HRD) by other means not specified in this Specification.

Semantic changes to VVC Draft 9 are now discussed. The semantics of a number of syntax elements should be specified in one way instead of two ways (e.g., consistently across syntax elements), the proposed deletions marked with <d> . . . </d> tags and insertions marked with <i> . . . </i> tags follow:

vps_max_tid_ref_present_flag[i] equal to 1 specifies that the syntax element vps_max_tid_il_ref_pics_plus1[i][j]<d> is </d><i> may be </i> present.

vps_max_tid_ref_present_flag[i] equal to 0 specifies that the syntax element
vps_max_tid_ref_pics_plus1[i][j] is not present.

sps_idr_rpl_present_flag equal to 1 specifies that reference picture list syntax elements <d> are</d><i> may be </i> present in slice headers of IDR pictures (or, in some examples, IDR VCL NAL units). sps_idr_rpl_present_flag equal to 0 specifies that reference picture list syntax elements are not present in slice headers of IDR pictures (or, in some examples, IDR VCL NAL units).

sps_bdof_control_present_in_ph_flag equal to 1 specifies that ph_bdof_disabled_flag <d> is</d><i> may be </i> present in PHs referring to the SPS. sps_bdof_control_present_in_ph_flag equal to 0 specifies that ph_bdof_disabled_flag is not present in PHs referring to the SPS. When sps_bdof_control_present_in_ph_flag is not present, the value of sps_bdof_control_present_in_ph_flag is inferred to be equal to 0.

sps_dmvr_control_present_in_ph_flag equal to 1 specifies that ph_dmvr_disabled_flag <d> is</d><i> may be </i> present in PHs referring to the SPS. sps_dmvr_control_present_in_ph_flag equal to 0 specifies that ph_dmvr_disabled_flag is not present in PHs referring to the SPS. When sps_dmvr_control_present_in_ph_flag is not present, the value of sps_dmvr_control_present_in_ph_flag is inferred to be equal to 0.

sps_prof_control_present_in_ph_flag equal to 1 specifies that ph_prof_disabled_flag <d> is</d><i> may be </i> present in PHs referring to the SPS. sps_prof_control_present_in_ph flag equal to 0 specifies that ph_prof_disabled_flag is not present in PHs referring to the SPS. When sps_prof_control_present in_ph flag is not present, the value of sps_prof_control_present in_ph flag is inferred to be equal to 0.

pps_sao_info_in_ph_flag equal to 1 specifies that SAO filter information <d> is</d><i> may be </i> present in the PH syntax structure and not present in slice headers referring to the PPS that do not contain a PH syntax structure. pps_sao_info_in_ph_flag equal to 0 specifies that SAO filter information is not present in the PH syntax structure and may be present in slice headers referring to the PPS. When not present, the value of pps_sao_info_in_ph_flag is inferred to be equal to 0.

pps_alf_info_in_ph_flag equal to 1 specifies that ALF information <d> is</d><i> may be </i> present in the PH syntax structure and not present in slice headers referring to the PPS that do not contain a PH syntax structure. pps_alf_info_in_ph_flag equal to 0 specifies that ALF information is not present in the PH syntax structure and may be present in slice headers referring to the PPS. When not present, the value of pps_alf_info_in_ph_flag is inferred to be equal to 0.

pps_output_flag_present_flag equal to 1 specifies that the ph_pic_output_flag syntax element <d> is</d><i> may </i> be </i> present in PHs referring to the PPS. pps_output_flag_present_flag equal to 0 specifies that the ph_pic_output_flag syntax element is not present in PHs referring to the PPS.

pps_cu_qp_delta_enabled_flag equal to 1 specifies that <i> at least one of</i> the ph_cu_qp_delta_subdiv_intra_slice and ph_cu_qp_delta_sub_div_inter_slice syntax elements are present in PHs referring to the PPS, and the cu_qp_delta_abs and cu_qp_delta_sign_flag syntax elements may be present in the transform unit syntax and the palette coding syntax. pps_cu_qp_delta_enabled_flag equal to 0 specifies that the ph_cu_qp_delta_subdiv_intra_slice and ph_cu_qp_delta_subdiv_inter_slice syntax elements are not present in PHs referring to the PPS, and the cu_qp_delta_abs and cu_qp_delta_sign_flag syntax elements are not present in the transform unit syntax or the palette coding syntax.

Figure 5:
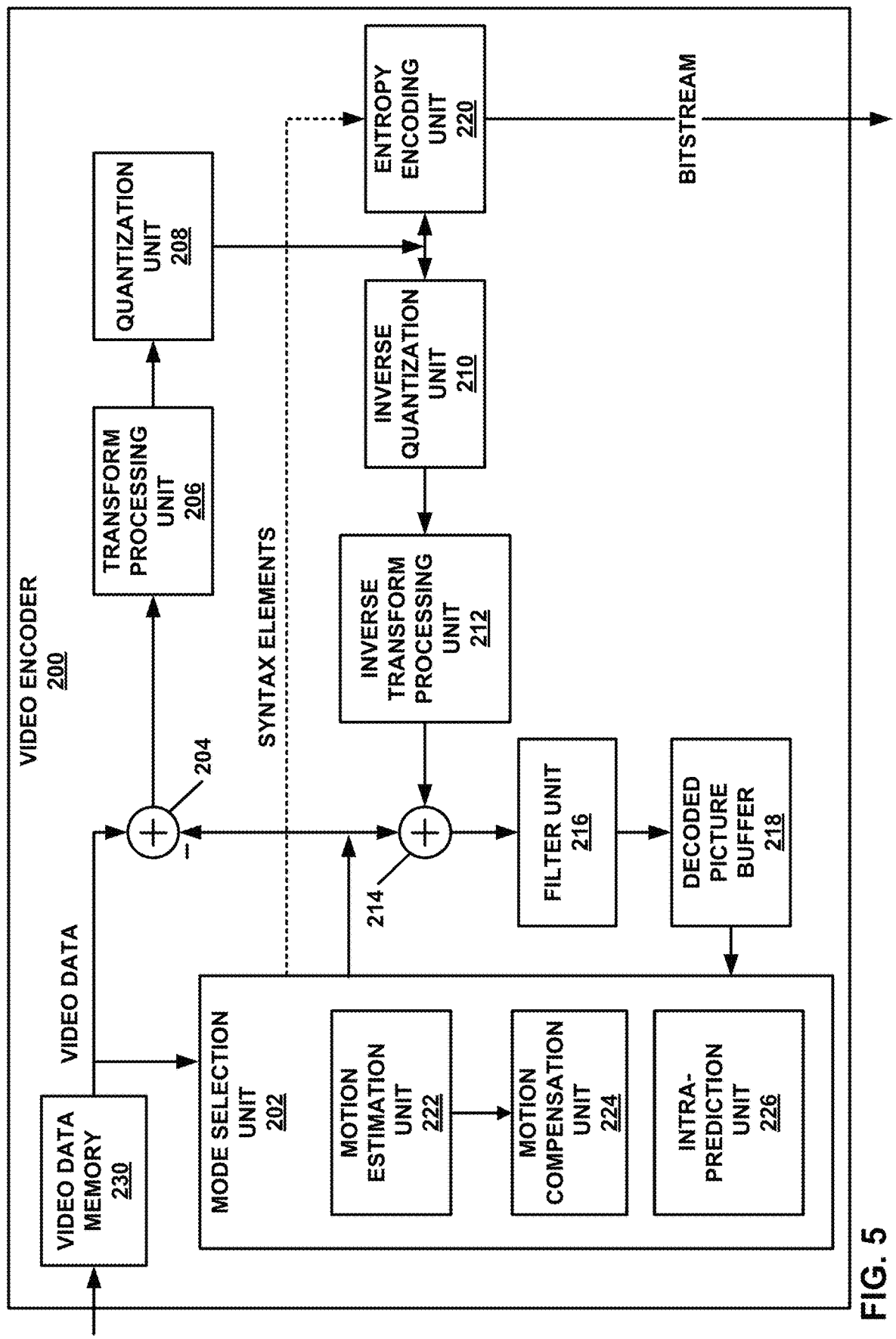
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations. In some examples, mode selection unit 202 may determine to apply a constraint that no rectangular slices are permitted. Mode selection unit 202 may determine a value of a first syntax element (e.g., no_rectangular_slice_constraint_flag) indicative of whether a first constraint is applicable, the first constraint being that no rectangular slices are permitted.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) or a syntax element indicative of whether a constraint is applicable, from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example device configured to encode video data including memory configured to store the video data, and one or more processors implemented in circuitry and communicatively coupled to the memory, the one or more processors being configured to: determine a value of a first syntax element indicative of whether a first constraint is applicable, the first constraint being that rectangular slices are not used for a first plurality of pictures; and encode the first plurality of pictures of the video data in accordance with the value of the first syntax element.

Video encoder 200 also represents an example of a device configured to encode video data including a memory configured to store video data, and one or more processing units implemented in circuitry and configured to perform any method or technique described in this disclosure.

Figure 6:
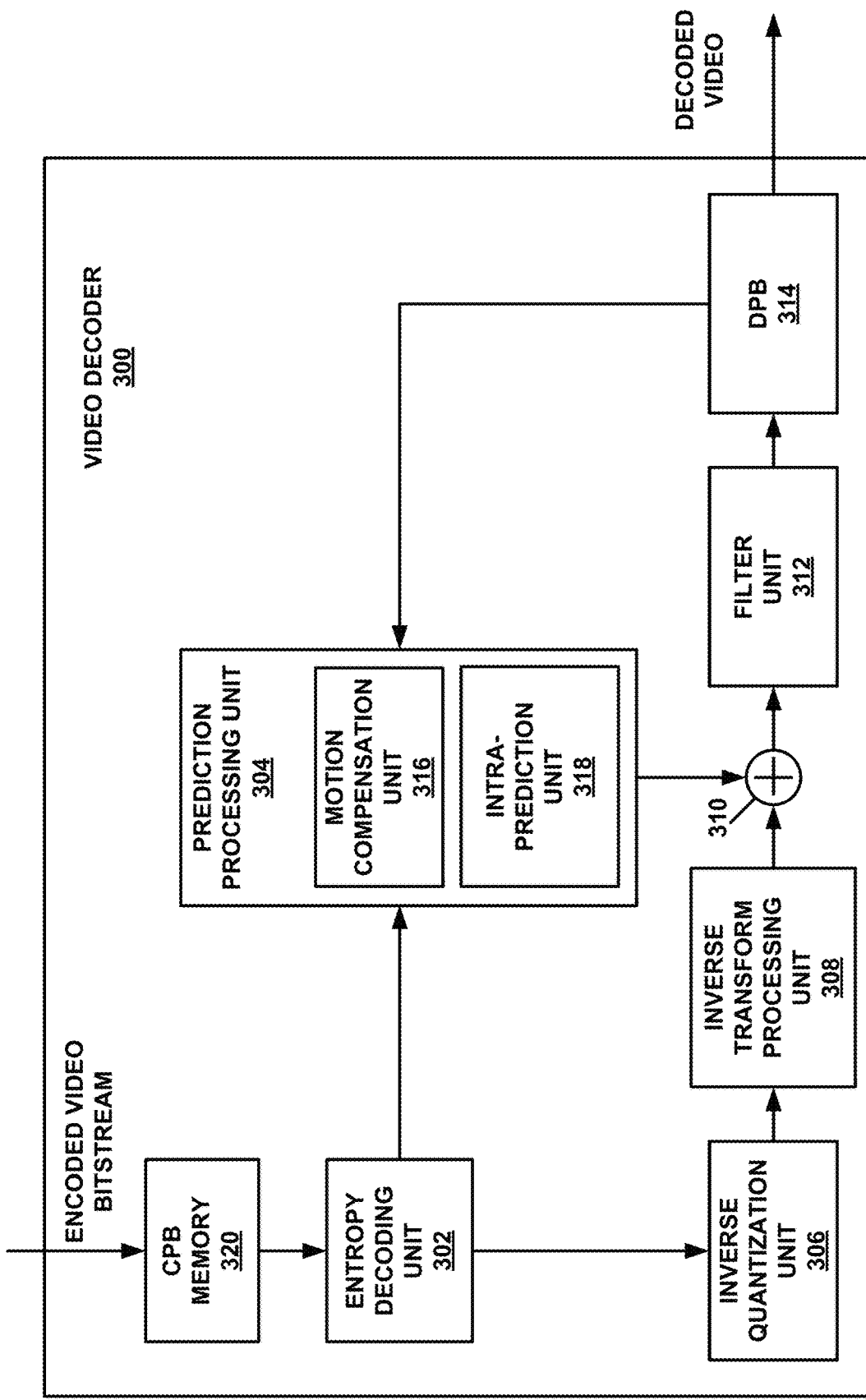
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). In some examples, entropy decoding unit 302 may entropy decode syntax elements indicative of whether a constraint is to be applied. For example, entropy decoding unit 302 may determine a value of a first syntax element indicative of whether a first constraint is applicable, the first constraint being that no rectangular slices are permitted.

Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5). In some examples, prediction processing unit may apply a first constraint that no rectangular slices are permitted based on the first syntax element indicating that now rectangular slices are permitted.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Video decoder 300 may represent an example of a video decoding device including memory configured to store the video data, and one or more processors implemented in circuitry and communicatively coupled to the memory, the one or more processors being configured to: determine a value of a first syntax element indicative of whether a first constraint is applicable, the first constraint being that rectangular slices are not used for a first plurality of pictures; and decode the first plurality of pictures of the video data in accordance with the value of the first syntax element.

Video decoder 300 may also represent an example of a video decoding device including a memory configured to store video data, and one or more processing units implemented in circuitry and configured to perform any method or technique described in this disclosure.

Figure 7:
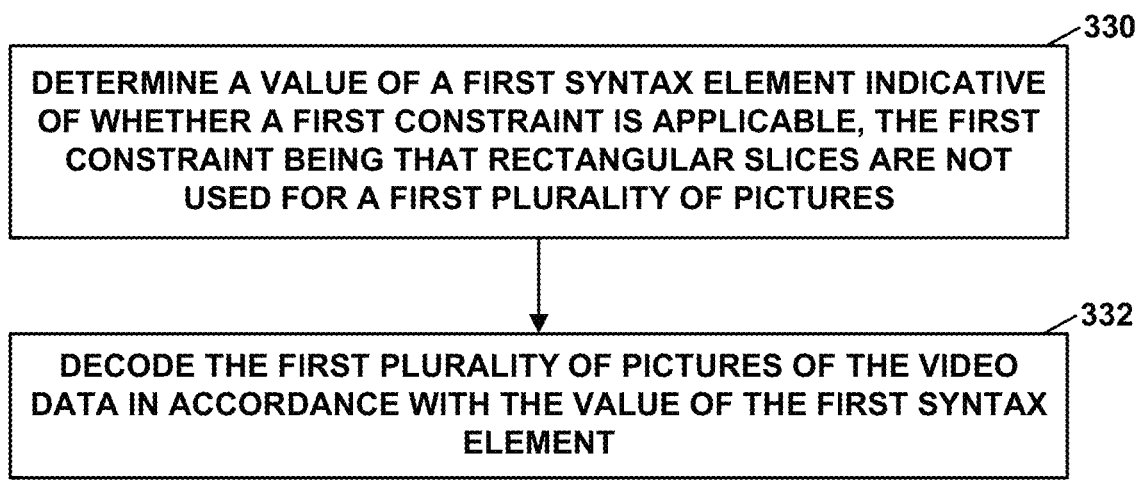
FIG. 7 is a flowchart illustrating an example general constraint technique according to this disclosure.

FIG. 7 is a flowchart illustrating an example general constraint technique according to this disclosure. Video encoder 200 or video decoder 300 may determine a value of a first syntax element indicative of whether a first constraint is applicable, the first constraint being that rectangular slices are not used for a first plurality of pictures (330). For example, video encoder 200 may perform multiple encoding passes to test combinations of encoding parameters and resulting rate-distortion values for such combinations. Video encoder 200 may determine that the first constraint should be applied based on the resulting rate-distortion values. In such a case, video encoder 200 may determine the value of the first syntax element to be indicative of the first constraint being applied. Alternatively, video encoder 200 may determine that the first constraint should not be applied based on the resulting rate-distortion values. In such a case, video encoder 200 may determine the value of the first syntax element to be indicative of the first constraint not being applied. Video encoder 200 may signal the first syntax element in a bitstream of encoded video data.

For example, video decoder 300 may receive the first syntax element in the bitstream of encoded video data. Video decoder 300 may determine the value of the first syntax element by parsing the first syntax element.

Video decoder 300 may decode the first plurality of pictures of the video data in accordance with the value of the first syntax element (332). For example, video encoder 200 may encode a first plurality of pictures of the video data in accordance with the value of the first syntax element. For example, if video encoder 200 determined to apply the first constraint, video encoder 200 may encode the first plurality of pictures of the video data with the first constraint applied (e.g., in accordance with the value of the first syntax element indicating the first constraint is applicable). Alternatively, if video encoder 200 determined not to apply the first constraint, video encoder 200 may encode the first plurality of pictures of the video data without the first constraint applied (e.g., in accordance with the value of the first syntax element indicating the first constraint is not applicable).

For example, video decoder 300 may decode the first plurality of pictures in accordance with the value of the first syntax element. For example, if the value of the first syntax element is indicative of the first constraint being applicable, video decoder 300 may decode the first plurality of pictures in accordance with the value of the first syntax element indicating that the first constraint is applicable. For example, video decoder 300 may decode the first plurality of pictures while applying the first constraint. Alternatively, if the value of the first syntax element is indicative of the first constraint not being applicable, video decoder 300 may decode the first plurality of pictures in accordance with the value of the first syntax element indicating that the first constraint is not applicable. For example, video decoder 300 may decode the first plurality of pictures without applying the first constraint.

In some examples, the value of the first syntax element indicates the first constraint is applicable, and video encoder 200 or video decoder 300 may, based on the value of the first syntax element indicating that the first constraint is applicable, determine that a value associated with a second syntax element for the first plurality of pictures equals 0, wherein the value of 0 for the second syntax element indicates that rectangular slices are not used for each picture among the first plurality of pictures to which a picture parameter set is applicable. In some examples, the first syntax element is no_rectangular_slice_constraint_flag and the second syntax element is pps_rect_slice_flag.

In some examples, video encoder 200 or video decoder 300 may determine a value of a third syntax element indicative of whether a second constraint is applicable, the second constraint being that each subpicture among a second plurality of pictures must only contain one slice and code the second plurality of pictures in accordance with the value of the third syntax element. For example, video encoder 200 may encode the second plurality of pictures in accordance with the value of the third syntax element or video decoder 300 may decode the second plurality of pictures in accordance with the value of the third syntax element.

In some examples, the value of the third syntax element indicates that the second constraint is applicable, and video encoder 200 or video decoder 300 may, based on the value of the third syntax element indicating that the second constraint is applicable, determine that a value associated with a fourth syntax element indicates that each subpicture among the second plurality of pictures to which a picture parameter set is applicable only contains one slice. In some examples, the third syntax element includes one_slice_per_subpicture_constraint_flag and the fourth syntax element includes pps_single_slice_per_subpic_flag.

In some examples, video decoder 300 may receive a Type I bitstream, the Type I bitstream comprising at least one picture header (PH) network abstraction layer (NAL) unit and at least one video coding layer (VCL) NAL unit, and decode the at least one PH NAL unit and the at least one VCL NAL unit.

In some examples, video encoder 200 may encode at least one picture header (PH) network abstraction layer (NAL) unit and the at least one video coding layer (VCL) NAL unit, and transmit a Type I bitstream, the Type I bitstream comprising the at least one PH NAL unit and the at least one VCL NAL unit.

Figure 8:
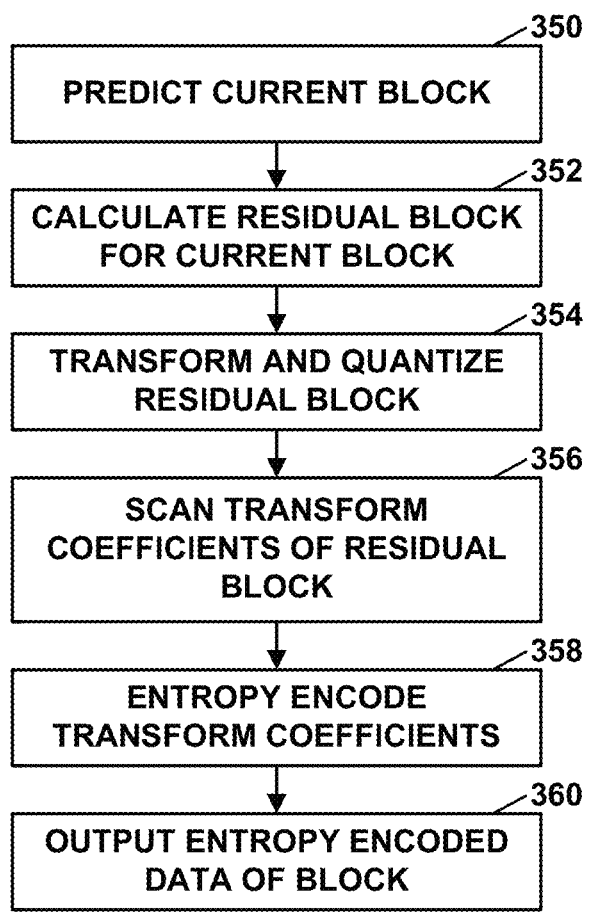
FIG. 8 is a flowchart illustrating an example method for encoding a current block.

FIG. 8 is a flowchart illustrating an example method for encoding a current block. The current block may comprise a current CU. Although described with respect to video encoder 200 (FIGS. 1 and 5), it should be understood that other devices may be configured to perform a method similar to that of FIG. 8. In some examples, while encoding the current block, video encoder 200 may also employ the techniques of FIG. 7.

In this example, video encoder 200 initially predicts the current block (350). For example, video encoder 200 may form a prediction block for the current block. In some examples, when predicting the current block, video encoder 200 may determine to apply a constraint, such as a constraint that prohibits rectangular slices. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360). In some examples, while encoding the current block, video encoder 200 may also employ the techniques of FIG. 7.

Figure 9:
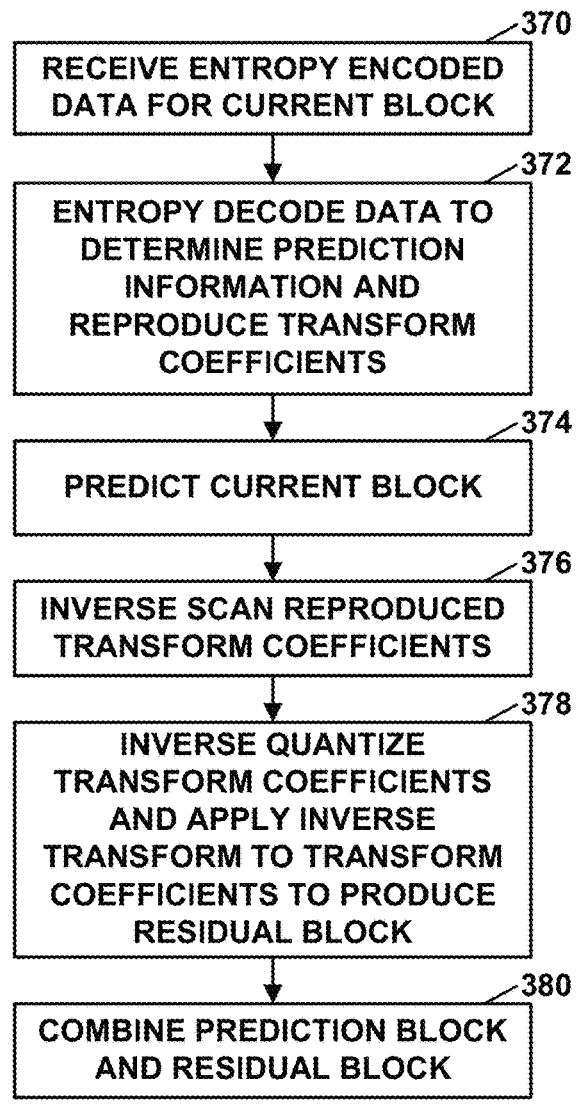
FIG. 9 is a flowchart illustrating an example method for decoding a current block of video data.

FIG. 9 is a flowchart illustrating an example method for decoding a current block of video data. The current block may comprise a current CU. Although described with respect to video decoder 300 (FIGS. 1 and 6), it should be understood that other devices may be configured to perform a method similar to that of FIG. 9.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). For example, entropy decoder may determine a value of a syntax element indicative of whether a constraint, such as no rectangular slices being permitted, is to be applied. Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

By utilizing general constraint flags indicative of whether a constraint is to be applied, and inferring values of other syntax elements based on the general constraint flags rather than signaling and parsing other syntax elements that may be at a lower level, the techniques of this disclosure may save signaling bandwidth and processing power on both video encoder 200 and video decoder 300. Additionally, by including PH NAL units in a Type I bitstream, decoding latency and/or accuracy may be improved, as PH NAL units may be needed by a video decoder to decode VCL NAL units within the Type I bitstream.

The following numbered clauses illustrate one or more aspects of the devices and techniques described in this disclosure.

Clause 1A. A method of processing video data, the method comprising: obtaining a bitstream that comprises an encoded representation of the video data; and determining that the bitstream does not conform to a video coding standard based on the bitstream including a current picture that references a picture before a Gradual Decoding Refresh (GDR) picture or references any picture before a picture with a Picture Order Count (POC) value equal to applicable recovery POC values.

Clause 2A. The method of clause 1A, wherein determining that the bitstream does not conform to the video coding standard comprises: determining that the bitstream does not conform to the video coding standard based on a determination that, when the current picture follows a recovery point picture having the same value of nuh_layer_id in both decoding order and output order, there is a picture referred to by an active entry in RefPicList[0] or RefPicList[1] that precedes that recovery point picture in output order or decoding order.

Clause 3A. The method of any of clauses 1A-2A, wherein the bitstream is a first bitstream and the method further comprises: obtaining a second bitstream that comprises an encoded representation of second video data; and decoding the second video data based on a determination that the bitstream conforms to the video coding standard.

Clause 4A. A method of encoding video data, the method comprising: obtaining video data; and encoding the video data subject to a constraint that disallows a current picture from referencing a picture before a Gradual Decoding Refresh (GDR) picture or referencing a picture before a picture with a Picture Order Count (POC) value equal to applicable recovery POC values.

Clause 5A. The method of clause 4A, wherein the constraint requires that when the current picture follows a recovery point picture having the same value of nuh_layer_id in both decoding order and output order, there shall be no picture referred to by an active entry in RefPicList[0] or RefPicList[1] that precedes that recovery point picture in output order or decoding order.

Clause 1B. A method of processing video data, the method comprising: obtaining a bitstream that includes an encoded representation of the video data; and determining that the bitstream does not conform to a video coding standard based on a determination that one or more of the following constraints is not satisfied: When intra_only_constraint_flag is 1, a value of no_ref_pic_resampling_constraint_flag, all_layers_independent_constraint_flag and o_mixed_nalu_types_in_pic_constraint_flag shall be equal to 1 When no_ref_pic_resampling_constraint_flag is 1, a value of no_res_change_in_clvs_constraint_flag shall be equal to 1 When one_subpic_per_pic_constraint_flag, a value of no_mixed_nalu_types_in_pic_constraint_flag shall be equal to 1 When no_cra_constraint_flag is 1, a value of no_rasl_constraint_flag shall be equal to 1 The value of no_idr_constraint_flag, no_cra_constraint_flag, and no_gdr_constraint_flag shall not be all equal to 1.

Clause 2B. The method of clause 1B, wherein the bitstream is a first bitstream and the method further comprises: obtaining a second bitstream that comprises an encoded representation of second video data; and decoding the second video data based on a determination that the bitstream conforms to the video coding standard.

Clause 3B. A method of encoding video data, the method comprising: obtaining video data; and encoding the video data subject to one or more of the following constraints: When intra_only_constraint_flag is 1, a value of no_ref_pic_resampling_constraint_flag, all_layers_independent_constraint_flag and no_mixed_nalu_types_in_pic_constraint_flag shall be equal to 1 When no_ref_pic_resampling_constraint_flag is 1, a value of no_res_change_in_clvs_constraint_flag shall be equal to 1 When one_subpic_per_pic_constraint_flag, a value of no_mixed_nalu_types_in_pic_constraint_flag shall be equal to 1 When no_cra_constraint_flag is 1, a value of no_rasl_constraint_flag shall be equal to 1 The value of no_idr_constraint_flag, no_cra_constraint_flag, and no_gdr_constraint_flag shall not be all equal to 1.

Clause 1C. A method of processing video data, the method comprising: obtaining a bitstream that comprises an encoded representation of the video data, the bitstream being for one or more output layer sets that are in scope; and determining, based on a syntax element in the bitstream, whether a constraint applies that specifies that there shall not be any Hypothetical Reference Decoder (HRD) related Supplemental Enhancement Information (SEI) messages present in the bitstream.

Clause 2C. A method of processing video data, the method comprising: obtaining a bitstream that comprises an encoded representation of the video data, the bitstream being for one or more output layer sets that are in scope; and determining, based on a syntax element in the bitstream, whether a constraint applies that specifies that there shall not be any Dependent Random Access Point indication Supplemental Enhancement Information (SEI) messages present in the bitstream.

Clause 3C. A method of processing video data, the method comprising: obtaining a bitstream that comprises an encoded representation of the video data, the bitstream being for one or more output layer sets that are in scope; and determining, based on a syntax element in the bitstream, whether a constraint applies that specifies that there shall not be any omnidirectional video specific Supplemental Enhancement Information (SEI) messages present in the bitstream.

Clause 4C. A method of processing video data, the method comprising: obtaining a bitstream that comprises an encoded representation of the video data; and determining, based on a syntax element in the bitstream, whether a constraint applies that specifies that there shall not be any omnidirectional video specific Supplemental Enhancement Information (SEI) messages present in the bitstream.

Clause 5C. A method of processing video data, the method comprising: obtaining a bitstream that comprises an encoded representation of the video data; and determining, based on a first syntax element in the bitstream, whether a constraint applies that specifies that a second syntax element in the bitstream indicates that a video usability information syntax structure is not present in a Sequence Parameter Set (SPS) raw byte sequence payload (RBSP) syntax structure.

Clause 6C. A method of processing video data, the method comprising: obtaining a bitstream that comprises an encoded representation of the video data; and determining, based on a first syntax element in the bitstream, whether a constraint applies that specifies that a second syntax element in the bitstream shall be in a range of 0 to a maximum layers syntax element−1, wherein the second syntax element specifies a maximum allowed number of layers in each coded video sequence referring to a video parameter set.

Clause 7C. A method of processing video data, the method comprising: obtaining a bitstream that comprises an encoded representation of the video data; and determining, based on a first syntax element in the bitstream, whether a constraint applies that specifies that a second syntax element in the bitstream shall be in a range of 0 to a maximum sublayers syntax element−1, wherein the second syntax element specifies a maximum allowed number of sublayers in each coded video sequence referring to a video parameter set.

Clause 8C. A method of processing video data, the method comprising: obtaining a bitstream that comprises an encoded representation of the video data; and determining, based on a first syntax element in the bitstream, whether a constraint applies that specifies that a second syntax element in the bitstream shall be in a range of 0 to a maximum subpictures syntax element−1, wherein the second syntax element specifies a maximum allowed number of subpictures in each picture in a coded layer video sequence.

Clause 9C. A method of processing video data, the method comprising: obtaining a bitstream that comprises an encoded representation of the video data; and determining, based on a first syntax element in the bitstream, whether a constraint applies that specifies that a second syntax element in the bitstream shall indicate that no picture partitioning is applied to each picture referring to a picture parameter set.

Clause 10C. The method of any of clauses 1C-9C, further comprising decoding the bitstream.

Clause 11C. A method of encoding video data, the method comprising: obtaining video data; and encoding the video data such that a bitstream includes one or more of the following: a first syntax element indicating whether a first constraint applies that specifies that there shall not be any Hypothetical Reference Decoder (HRD) related Supplemental Enhancement Information (SEI) messages present in the bitstream, a second syntax element indicating whether a second constraint applies that specifies that there shall not be any Dependent Random Access Point indication SEI messages present in the bitstream, a third syntax element indicating whether a third constraint applies that specifies that there shall not be any omnidirectional video specific SEI messages present in the bitstream, a fourth syntax element that indicates whether a fourth constraint applies that specifies that a fifth syntax element indicates that a video usability information syntax structure is not present in a Sequence Parameter Set (SPS) raw byte sequence payload (RBSP) syntax structure, a sixth syntax element that indicates whether a fifth constraint applies that specifies that a seventh syntax element shall be in a range of 0 to a maximum layers syntax element−1, wherein the seventh syntax element specifies a maximum allowed number of layers in each coded video sequence referring to a video parameter set, an eighth syntax element that indicates whether a sixth constraint applies that specifies that a ninth syntax element in the bitstream shall be in a range of 0 to a maximum sublayers syntax element−1, wherein the ninth syntax element specifies a maximum allowed number of sublayers in each coded video sequence referring to a video parameter set, a tenth syntax element that indicates whether a seventh constraint applies that specifies that an eleventh syntax element shall be in a range of 0 to a maximum subpictures syntax element−1, wherein the eleventh syntax element specifies a maximum allowed number of subpictures in each picture in a coded layer video sequence, or a twelfth syntax element that indicates whether an eighth constraint applies that specifies that a thirteenth syntax element shall indicate that no picture partitioning is applied to each picture referring to a picture parameter set.

Clause 1D. A method of processing video data, the method comprising: obtaining a bitstream that comprises an encoded representation of the video data; and determining that the bitstream does not conform to a video coding standard based on a violation of a constraint that specifies that when vps_video_parameter_set_id is greater than 0 and vps_all_layers_same_num_sublayers_flag is equal to 1, the value of sps_max_sublayers_minus1 shall be equal to the value of vps_max_sublayers_minus1.

Clause 2D. The method of clause 1D, wherein the bitstream is a first bitstream and the method comprises decoding a second bitstream that comprises a second encoded representation of the video data based on the second bitstream conforming to the video coding standard.

Clause 3D. A method of encoding video data, the method comprising: obtaining the video data; and encoding the video data to conform to a constraint that specifies that when vps_video_parameter_set_id is greater than 0 and vps_all_layers_same_num_sublayers_flag is equal to 1, the value of sps_max_sublayers_minus1 shall be equal to the value of vps_max_sublayers_minus1.

Clause 1E. A method of decoding video data, the method comprising: determining, based on a maximum width of each decoded picture referring to a sequence parameter set (SPS) being greater than a size of a coding tree block or a maximum heights of each of the decoded pictures referring to the SPS being greater than the size of the coding tree block, that a bitstream includes a syntax element indicating a number of subpictures in each picture in a coded layer video sequence; and based on the bitstream including the syntax element, decoding the bitstream in part based on the syntax element.

Clause 2E. A method of encoding video data, the method comprising: based on a maximum width of each decoded picture referring to a sequence parameter set (SPS) being greater than a size of a coding tree block or a maximum heights of each of the decoded pictures referring to the SPS being greater than the size of the coding tree block, signaling a syntax element in a bitstream that comprises an encoded representation of the video data, the syntax element indicating a number of subpictures in each picture in a coded layer video sequence.

Clause 1F. A method for processing video data, the method comprising: at least one of: determining that a bitstream includes a first syntax element based on a width of each picture referring to a picture parameter set (PPS) in luma samples being greater than a size of luma coding tree blocks of the pictures referring to the PPS, the first syntax element indicating a number of explicitly provided tile column widths in the PPS, or determining that a bitstream includes a second syntax element based on a height of each picture referring to a picture parameter set (PPS) in luma samples being greater than a size of luma coding tree blocks of the pictures referring to the PPS, the second syntax element indicating a number of explicitly provided tile column heights in the PPS; and decoding the pictures referring to the PPS based on the tile column widths and the tile column heights.

Clause 2F. A method for encoding video data, the method comprising: at least one of: signaling, in a bitstream, a first syntax element based on a width of each picture referring to a picture parameter set (PPS) in luma samples being greater than a size of luma coding tree blocks of the pictures referring to the PPS, the first syntax element indicating a number of explicitly provided tile column widths in the PPS, or signaling, in a bitstream, a second syntax element based on a height of each picture referring to a picture parameter set (PPS) in luma samples being greater than a size of luma coding tree blocks of the pictures referring to the PPS, the second syntax element indicating a number of explicitly provided tile column heights in the PPS; and encoding the pictures referring to the PPS based on the tile column widths and the tile column heights.

Clause 1G. A method for processing video data, the method comprising: determining that a bitstream includes a first syntax element based on each of the following conditions being true: (i) a number of slices in rectangular slices in each picture referring to a picture parameter set (PPS), minus 1, is greater than 1, (ii) a number of tiles in each of the pictures referring to the PPS is greater than 1, (iii) a width of each of the pictures referring to the PPS in luma samples is greater than a size of luma coding tree blocks of the pictures referring to the PPS, and (iv) a height of each of the pictures referring to the PPS in luma samples is greater than the size of the luma coding tree blocks of the pictures referring to the PPS, wherein the first syntax element indicates whether second syntax elements are present in the PPS and all of the pictures referring to the PPS are partitioned into rectangular slice rows and rectangular slice columns in slice raster order; and based on the first syntax element indicating that the second syntax elements are present in the PPS: parsing the second syntax elements from the bitstream; and using the second syntax elements to decode the pictures referring to the PPS.

Clause 2G. The method of clause 1G, further comprising: determining that the bitstream does not conform to a video coding standard based on the following constraint being violated: when the number of tiles in each of the pictures referring to the PPS is equal to 1, or the width of each of the pictures referring to the PPS in luma samples is less than or equal to the size of luma coding tree blocks of the pictures referring to the PPS, or the height of each of the pictures referring to the PPS in luma samples is less than or equal to the size of luma coding tree blocks of the pictures referring to the PPS, the first syntax element shall indicate that the second syntax elements are not present in the PPS and all of the pictures referring to the PPS are partitioned into rectangular slice rows and rectangular slice columns in slice raster order.

Clause 3G. A method for encoding video data, the method comprising: signaling, in a bitstream includes a first syntax element based on each of the following conditions being true: (i) a number of slices in rectangular slices in each picture referring to a picture parameter set (PPS), minus 1, is greater than 1, (ii) a number of tiles in each of the pictures referring to the PPS is greater than 1, (iii) a width of each of the pictures referring to the PPS in luma samples is greater than a size of luma coding tree blocks of the pictures referring to the PPS, and (iv) a height of each of the pictures referring to the PPS in luma samples is greater than a size of luma coding tree blocks of the pictures referring to the PPS, wherein the first syntax element indicates whether second syntax elements are present in the PPS and all of the pictures referring to the PPS are partitioned into rectangular slice rows and rectangular slice columns in slice raster order; and based on the first syntax element indicating that the second syntax elements are present in the PPS signaling the second syntax elements from the bitstream.

Clause 4G. The method of clause 3G, generating the bitstream to conform to a video coding standard based on the following constraint being violated: when the number of tiles in each of the pictures referring to the PPS is equal to 1, or the width of each of the pictures referring to the PPS in luma samples is less than or equal to the size of luma coding tree blocks of the pictures referring to the PPS, or the height of each of the pictures referring to the PPS in luma samples is less than or equal to the size of luma coding tree blocks of the pictures referring to the PPS, the first syntax element shall indicate that the second syntax elements are not present in the PPS and all of the pictures referring to the PPS are partitioned into rectangular slice rows and rectangular slice columns in slice raster order.

Clause 1H. A method of processing video data, the method comprising: obtaining a bitstream that includes an encoded representation of the video data; and determining that the bitstream does not conform to a video coding standard based on the bitstream violating a constraint that requires that, when a current picture follows a recovery point picture having the same value of a Network Abstraction Layer (NAL) unit header layer identifier in both decoding order and output order, there shall be no picture referred to by an Inter-Layer Reference Prediction (ILRP) active entry in a first reference picture list or a second reference picture list that precedes the recovery point picture in output order or decoding order of an associated Gradual Decoding Refresh (GDR) picture with a NAL unit header layer identifier equal to a reference picture layer identifier.

Clause 2H. A method of encoding video data, the method comprising: obtaining video data; and encoding the video data to generate a bitstream such that the bitstream does not violate a constraint that requires that, when a current picture follows a recovery point picture having the same value of a Network Abstraction Layer (NAL) unit header layer identifier in both decoding order and output order, there shall be no picture referred to by an Inter-Layer Reference Prediction (ILRP) active entry in a first reference picture list or a second reference picture list that precedes the recovery point picture in output order or decoding order of an associated Gradual Decoding Refresh (GDR) picture with a NAL unit header layer identifier equal to a reference picture layer identifier.

Clause 1I. A method of processing video data, the method comprising: obtaining a bitstream that includes an encoded representation of the video data; and determining that the bitstream does not conform to a video coding standard based on the bitstream violating a constraint that requires that when a current picture follows a recovery point picture having a same value of a Network Abstraction Layer (NAL) unit header layer identifier in both decoding order and output order, there shall be no reference picture referred to by an active entry in a first reference picture list or a second reference picture list that precedes the recovery point picture in output order or decoding order of an associated Gradual Decoding Refresh (GDR) picture in a layer with a NAL unit header layer identifier equal to a NAL unit header layer identifier of the reference picture.

Clause 2I. A method of encoding video data, the method comprising: obtaining video data; and encoding the video data to generate a bitstream such that the bitstream does not violate a constraint that requires that when a current picture follows a recovery point picture having a same value of a Network Abstraction Layer (NAL) unit header layer identifier in both decoding order and output order, there shall be no reference picture referred to by an active entry in a first reference picture list or a second reference picture list that precedes the recovery point picture in output order or decoding order of an associated Gradual Decoding Refresh (GDR) picture in a layer with a NAL unit header layer identifier equal to a NAL unit header layer identifier of the reference picture.

Clause 1J. A method of processing video data, the method comprising: obtaining a bitstream that includes an encoded representation of the video data; and determining that the bitstream does not conform to a video coding standard based on the bitstream violating any constraint set forth in this disclosure.

Clause 2J. A method of encoding video data, the method comprising: obtaining video data; and encoding the video data to generate a bitstream such that the bitstream does not violate any of the constraints set forth in this disclosure.

Clause 1K. A device for processing or encoding video data, the device comprising one or more means for performing the method of any of clauses 1A-2J.

Clause 2K. The device of clause 1K, wherein the one or more means comprise one or more processors implemented in circuitry.

Clause 3K. The device of any of clauses 1K and 2K, further comprising a memory to store the video data.

Clause 4K. The device of any of clauses 1K-3K, further comprising a display configured to display decoded video data.

Clause 5K. The device of any of clauses 1K-4K, wherein the device comprises one or more of a camera, a computer, a mobile device, a broadcast receiver device, or a set-top box.

Clause 6K. The device of any of clauses 1K-5K, wherein the device comprises a video decoder.

Clause 7K. The device of any of clauses 1K-6K, wherein the device comprises a video encoder.

Clause 8K. A computer-readable storage medium having stored thereon instructions that, when executed, cause one or more processors to perform the method of any of clauses 1A-2J.

Clause 1L. A method of decoding video data, the method comprising: determining a value of a first syntax element indicative of whether a first constraint is applicable, the first constraint being that rectangular slices are not used for a first plurality of pictures; and decoding the first plurality of pictures of the video data in accordance with the value of the first syntax element.

Clause 2L. The method of clause 1L, further comprising: based on the value of the first syntax element indicating that the first constraint is applicable, determining that a value associated with a second syntax element for the first plurality of pictures equals 0, wherein the value of 0 for the second syntax element indicates that rectangular slices are not used for each picture among the first plurality of pictures to which a picture parameter set is applicable.

Clause 3L. The method of clause 1L, further comprising: determining a value of a third syntax element indicative of whether a second constraint is applicable, the second constraint being that each subpicture among a second plurality of pictures must only contain one slice; and decoding each subpicture among the second plurality of pictures in accordance with the value of the third syntax element.

Clause 4L. The method of clause 3L, further comprising: based on the value of the third syntax element indicating that the second constraint is applicable, determining that a value associated with a fourth syntax element indicates that each subpicture among the second plurality of pictures to which a picture parameter set is applicable only contains one slice.

Clause 5L. The method of any of clauses 1L-4L, further comprising: receiving a Type I bitstream, the Type I bitstream comprising at least one picture header (PH) network abstraction layer (NAL) unit and at least one video coding layer (VCL) NAL unit; and decoding the at least one PH NAL unit and the at least one VCL NAL unit.

Clause 6L. A device for decoding video data, the device comprising: memory configured to store the video data, and one or more processors implemented in circuitry and communicatively coupled to the memory, the one or more processors being configured to: determine a value of a first syntax element indicative of whether a first constraint is applicable, the first constraint being that rectangular slices are not used for a first plurality of pictures; and decode the first plurality of pictures of the video data in accordance with the value of the first syntax element.

Clause 7L. The device of clause 6L, wherein the one or more processors are further configured to: based on the value of the first syntax element indicating that the first constraint is applicable, determine that a value associated with a second syntax element for the first plurality of pictures equals 0, wherein the value of 0 for the second syntax element indicates that rectangular slices are not used for each picture among the first plurality of pictures to which a picture parameter set is applicable.

Clause 8L. The device of clause 6L, wherein the one or more processors are further configured to: determine a value of a third syntax element indicative of whether a second constraint is applicable, the second constraint being that each subpicture among a second plurality of pictures must only contain one slice; and decode each subpicture among the second plurality of pictures in accordance with the value of the third syntax element.

Clause 9L. The device of clause 8L, wherein the one or more processors are further configured to: based on the value of the third syntax element indicating that the second constraint is applicable, determine that a value associated with a fourth syntax element indicates that each subpicture among the second plurality of pictures to which a picture parameter set is applicable only contains one slice.

Clause 10L. The device of any of clauses 6L-9L, wherein the one or more processors are further configured to: receive a Type I bitstream, the Type I bitstream comprising at least one picture header (PH) network abstraction layer (NAL) unit and at least one video coding layer (VCL) NAL unit; and decode the at least one PH NAL unit and the at least one VCL NAL unit.

Clause 11L. A non-transitory computer-readable medium storing instructions that, when executed, cause one or more processors to: determine a value of a first syntax element indicative of whether a first constraint is applicable, the first constraint being that rectangular slices are not used for a first plurality of pictures; and decode the first plurality of pictures of the video data in accordance with the value of the first syntax element.

Clause 12L. The non-transitory computer-readable medium of clause 11L, wherein the instructions further cause the one or more processors to: based on the value of the first syntax element indicating that the first constraint is applicable, determine that a value associated with a second syntax element for the first plurality of pictures equals 0, wherein the value of 0 for the second syntax element indicates that rectangular slices are not used for each picture among the first plurality of pictures to which a picture parameter set is applicable.

Clause 13L. The non-transitory computer-readable medium of clause 11L, wherein the instructions further cause the one or more processors to: determine a value of a third syntax element indicative of whether a second constraint is applicable, the second constraint being that each subpicture among a second plurality of pictures must only contain one slice; and decode each subpicture among the second plurality of pictures in accordance with the value of the third syntax element.

Clause 14L. The non-transitory computer-readable medium of clause 13L, wherein the instructions further cause the one or more processors to: based on the value of the third syntax element indicating that the second constraint is applicable, determine that a value associated with a fourth syntax element indicates that each subpicture among the second plurality of pictures to which a picture parameter set is applicable only contains one slice.

Clause 15L. The non-transitory computer-readable medium of any of clauses 11L-14L, wherein the instructions further cause the one or more processors to: receive a Type I bitstream, the Type I bitstream comprising at least one picture header (PH) network abstraction layer (NAL) unit and at least one video coding layer (VCL) NAL unit; and decode the at least one PH NAL unit and the at least one VCL NAL unit.

Clause 16L. A device for decoding video data, the device comprising: means for determining a value of a first syntax element indicative of whether a first constraint is applicable, the first constraint being that rectangular slices are not used for a first plurality of pictures; and means for decoding the first plurality of pictures of the video data in accordance with the value of the first syntax element.

Clause 17L. The device of clause 16L, further comprising: means for determining, based on the value of the first syntax element indicating that the first constraint is applicable, that a value associated with a second syntax element for the first plurality of pictures equals 0, wherein the value of 0 for the second syntax element indicates that rectangular slices are not used for each picture among the first plurality of pictures to which a picture parameter set is applicable.

Clause 18L. The device of clause 16L, further comprising: means for determining a value of a third syntax element indicative of whether a second constraint is applicable, the second constraint being that each subpicture among a second plurality of pictures must only contain one slice; and means for decoding each subpicture among the second plurality of pictures in accordance with the value of the third syntax element.

Clause 19L. The device of clause 18L, further comprising: means for determining, based on the value of the third syntax element indicating that the second constraint is applicable, that a value associated with a fourth syntax element indicates that each subpicture among the second plurality of pictures to which a picture parameter set is applicable only contains one slice.

Clause 20L. The device of any of clauses 16L-19L, further comprising: means for receiving a Type I bitstream, the Type I bitstream comprising at least one picture header (PH) network abstraction layer (NAL) unit and at least one video coding layer (VCL) NAL unit; and means for decoding the at least one PH NAL unit and the at least one VCL NAL unit.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a value of a first syntax element indicative of whether a first general constraint of a set of one or more general constraints is applicable, the first general constraint being that rectangular slices are not used for a first plurality of pictures, wherein each of the one or more general constraints restricts a coding feature or a coding tool in a bitstream; and decoding the first plurality of pictures of the video data in accordance with the value of the first syntax element.

2. The method of claim 1, further comprising:
based on the value of the first syntax element indicating that the first general constraint is applicable, determining that a value associated with a second syntax element for the first plurality of pictures equals 0, wherein the value of 0 for the second syntax element indicates that rectangular slices are not used for each picture among the first plurality of pictures to which a picture parameter set is applicable, wherein the first syntax element and the second syntax element are different syntax elements.

3. The method of claim 1, further comprising:
determining a value of a third syntax element indicative of whether a second general constraint of the set of one or more general constraints is applicable, the second general constraint being that each subpicture among a second plurality of pictures must only contain one slice; and
decoding each subpicture among the second plurality of pictures in accordance with the value of the third syntax element.

4. The method of claim 3, further comprising:
based on the value of the third syntax element indicating that the second general constraint is applicable, determining that a value associated with a fourth syntax element indicates that each subpicture among the second plurality of pictures to which a picture parameter set is applicable only contains one slice, wherein the third syntax element and the fourth syntax element are different syntax elements.

5. The method of claim 1, wherein the bitstream is a first bitstream, the method further comprising:
receiving a second bitstream, the second bitstream including a Type I bitstream, the Type I bitstream comprising at least one picture header (PH) network abstraction layer (NAL) unit and at least one video coding layer (VCL) NAL unit; and
decoding the at least one PH NAL unit and the at least one VCL NAL unit.

6. A device for decoding video data, the device comprising:
memory configured to store the video data, and
one or more processors implemented in circuitry and communicatively coupled to the memory, the one or more processors being configured to:
determine a value of a first syntax element indicative of whether a first general constraint of a set of one or more general constraints is applicable, the first general constraint being that rectangular slices are not used for a first plurality of pictures, wherein each of the one or more general constraints restricts a coding feature or a coding tool in a bitstream; and
decode the first plurality of pictures of the video data in accordance with the value of the first syntax element.

7. The device of claim 6, wherein the one or more processors are further configured to:
based on the value of the first syntax element indicating that the first general constraint is applicable, determine that a value associated with a second syntax element for the first plurality of pictures equals 0, wherein the value of 0 for the second syntax element indicates that rectangular slices are not used for each picture among the first plurality of pictures to which a picture parameter set is applicable, wherein the first syntax element and the second syntax element are different syntax elements.

8. The device of claim 6, wherein the one or more processors are further configured to:
determine a value of a third syntax element indicative of whether a second general constraint of the set of one or more general constraints is applicable, the second general constraint being that each subpicture among a second plurality of pictures must only contain one slice; and
decode each subpicture among the second plurality of pictures in accordance with the value of the third syntax element.

9. The device of claim 8, wherein the one or more processors are further configured to:
based on the value of the third syntax element indicating that the second general constraint is applicable, determine that a value associated with a fourth syntax element indicates that each subpicture among the second plurality of pictures to which a picture parameter set is applicable only contains one slice, wherein the third syntax element and the fourth syntax element are different syntax elements.

10. The device of claim 6, wherein the bitstream is a first bitstream and wherein the one or more processors are further configured to:
receive a second bitstream, the second bitstream including a Type I bitstream, the Type I bitstream comprising at least one picture header (PH) network abstraction layer (NAL) unit and at least one video coding layer (VCL) NAL unit; and
decode the at least one PH NAL unit and the at least one VCL NAL unit.

11. A non-transitory computer-readable medium storing instructions that, when executed, cause one or more processors to:
determine a value of a first syntax element indicative of whether a first general constraint of a set of one or more general constraints is applicable, the first general constraint being that rectangular slices are not used for a first plurality of pictures, wherein each of the one or more general constraints restricts a coding feature or a coding tool in a bitstream; and
decode the first plurality of pictures of the video data in accordance with the value of the first syntax element.

12. The non-transitory computer-readable medium of claim 11, wherein the instructions further cause the one or more processors to:
based on the value of the first syntax element indicating that the first general constraint is applicable, determine that a value associated with a second syntax element for the first plurality of pictures equals 0, wherein the value of 0 for the second syntax element indicates that rectangular slices are not used for each picture among the first plurality of pictures to which a picture parameter set is applicable, wherein the first syntax element and the second syntax element are different syntax elements.

13. The non-transitory computer-readable medium of claim 11, wherein the instructions further cause the one or more processors to:
determine a value of a third syntax element indicative of whether a second general constraint of the set of one or more general constraints is applicable, the second general constraint being that each subpicture among a second plurality of pictures must only contain one slice; and decode each subpicture among the second plurality of pictures in accordance with the value of the third syntax element.

14. The non-transitory computer-readable medium of claim 13, wherein the instructions further cause the one or more processors to:

based on the value of the third syntax element indicating that the second general constraint is applicable, determine that a value associated with a fourth syntax element indicates that each subpicture among the second plurality of pictures to which a picture parameter set is applicable only contains one slice, wherein the third syntax element and the fourth syntax element are different syntax elements.

15. The non-transitory computer-readable medium of claim 11, wherein the bitstream is a first bitstream and wherein the instructions further cause the one or more processors to:

receive a second bitstream, the second bitstream including a Type I bitstream, the Type I bitstream comprising at least one picture header (PH) network abstraction layer (NAL) unit and at least one video coding layer (VCL) NAL unit; and decode the at least one PH NAL unit and the at least one VCL NAL unit.

16. A device for decoding video data, the device comprising:

means for determining a value of a first syntax element indicative of whether a first general constraint of a set of one or more general constraints is applicable, the first general constraint being that rectangular slices are not used for a first plurality of pictures, wherein each of the one or more general constraints restricts a coding feature or a coding tool in a bitstream; and means for decoding the first plurality of pictures of the video data in accordance with the value of the first syntax element.

17. The device of claim 16, further comprising:

means for determining, based on the value of the first syntax element indicating that the first general constraint is applicable, that a value associated with a second syntax element for the first plurality of pictures equals 0, wherein the value of 0 for the second syntax element indicates that rectangular slices are not used for each picture among the first plurality of pictures to which a picture parameter set is applicable, wherein the first syntax element and the second syntax element are different syntax elements.

18. The device of claim 16, further comprising:

means for determining a value of a third syntax element indicative of whether a second general constraint of the set of one or more general constraints is applicable, the second general constraint being that each subpicture among a second plurality of pictures must only contain one slice; and means for decoding each subpicture among the second plurality of pictures in accordance with the value of the third syntax element.

19. The device of claim 18, further comprising:

means for determining, based on the value of the third syntax element indicating that the second general constraint is applicable, that a value associated with a fourth syntax element indicates that each subpicture among the second plurality of pictures to which a picture parameter set is applicable only contains one slice, wherein the third syntax element and the fourth syntax element are different syntax elements.

20. The device of claim 16, the bitstream is a first bitstream, the device further comprising:

means for receiving a second bitstream, the second bitstream including a Type I bitstream, the Type I bitstream comprising at least one picture header (PH) network abstraction layer (NAL) unit and at least one video coding layer (VCL) NAL unit; and means for decoding the at least one PH NAL unit and the at least one VCL NAL unit.

* * * * *